United States Patent [19]
Berthold

[11] Patent Number: 5,957,252
[45] Date of Patent: Sep. 28, 1999

[54] HYDRAULIC SUSPENSION UNIT

[76] Inventor: Brian D. Berthold, 1126 Indian Pipe Ln., Zionsville, Ind. 46077

[21] Appl. No.: 08/691,232

[22] Filed: Aug. 2, 1996

[51] Int. Cl.$^6$ .................................................... F16F 9/34
[52] U.S. Cl. .................................... 188/314; 188/281
[58] Field of Search ................................ 188/297, 311, 188/313, 281, 282, 279, 289, 299, 312, 314, 322.13, 319, 317; 267/64.15, 64.19, 64.23; 280/698, 702, 708, 710, 712, 714

[56] References Cited

U.S. PATENT DOCUMENTS

| | | |
|---|---|---|
| 2,371,705 | 3/1945 | O'Connor . |
| 2,471,294 | 5/1949 | Watts . |
| 2,483,430 | 10/1949 | Pierce . |
| 2,512,269 | 6/1950 | Ezbelent . |
| 2,869,685 | 1/1959 | Funkhouser et al. . |
| 2,877,872 | 3/1959 | Krizan . |
| 2,957,703 | 10/1960 | Ross . |
| 3,127,958 | 4/1964 | Szostak . |
| 3,522,941 | 8/1970 | Henry-Biabaud . |
| 3,945,626 | 3/1976 | Tilkens . |
| 4,153,237 | 5/1979 | Supalla . |
| 4,159,106 | 6/1979 | Nyman . |
| 4,311,302 | 1/1982 | Heyer et al. . |
| 4,405,119 | 9/1983 | Masclet et al. . |
| 4,452,437 | 6/1984 | Lochner . |
| 4,478,431 | 10/1984 | Muller et al. . |
| 4,732,244 | 3/1988 | Verkuylen . |
| 4,858,733 | 8/1989 | Noguchi et al. . |
| 4,859,006 | 8/1989 | Philippe et al. . |
| 4,880,213 | 11/1989 | Shinbori et al. . |
| 4,921,224 | 5/1990 | Fukumura et al. . |
| 4,958,706 | 9/1990 | Richardson .................... 188/319.1 |
| 4,997,009 | 3/1991 | Niikura et al. . |
| 5,031,732 | 7/1991 | Batek et al. . |
| 5,094,325 | 3/1992 | Smith . |
| 5,190,126 | 3/1993 | Turnutt ............................. 188/317 |
| 5,332,068 | 7/1994 | Richardson et al. . |
| 5,351,790 | 10/1994 | Machida ........................... 188/314 |
| 5,477,947 | 12/1995 | Schalles ........................... 188/314 |

FOREIGN PATENT DOCUMENTS

| | | |
|---|---|---|
| 561396 | 4/1957 | Italy . |
| 794354 | 4/1958 | United Kingdom . |

*Primary Examiner*—Robert J. Oberleitner
*Assistant Examiner*—C. T. Bartz
*Attorney, Agent, or Firm*—Antonelli, Terry, Stout & Kraus, LLP

[57] ABSTRACT

An improved hydraulic suspension unit has a springing force and rebound damping which are related to one another so as to allow certain wheel movements to occour without the resistance of rebound damping. A primary springing force provided by a pressurized gas, a coil spring and elastomer or any combination therof acts directly through the shock fluid via a floating piston, bladder or flexible diaphragm. The primary spring force acts directly through the shock fluid, and thus directly on a rebound damping valve so that the rebound damping valve is only able to dampen the stored energy. The spring provides a maximun in tuning and adjustment capability for varying conditions with easily variable reload and rate. The rebound damping valve can also be adjusted, both to determine the maximum rebound resistance when damping springing energy, and thus maximum shock shaft velocity, and to determine the magnitude of th shaft movements that are allowed to occur without rebound damping. Compression damping can also be adjusted independently of rebound damping, and provides very high flow rates, and a much more desirbale compression damping control. These adjustments can be made external to the suspension unit and require no disassembly. A lightweight vehicle is disclose which utlizes the improved hydraulic suspension unit.

39 Claims, 7 Drawing Sheets

COMPRESSION FLOW

REBOUND FLOW

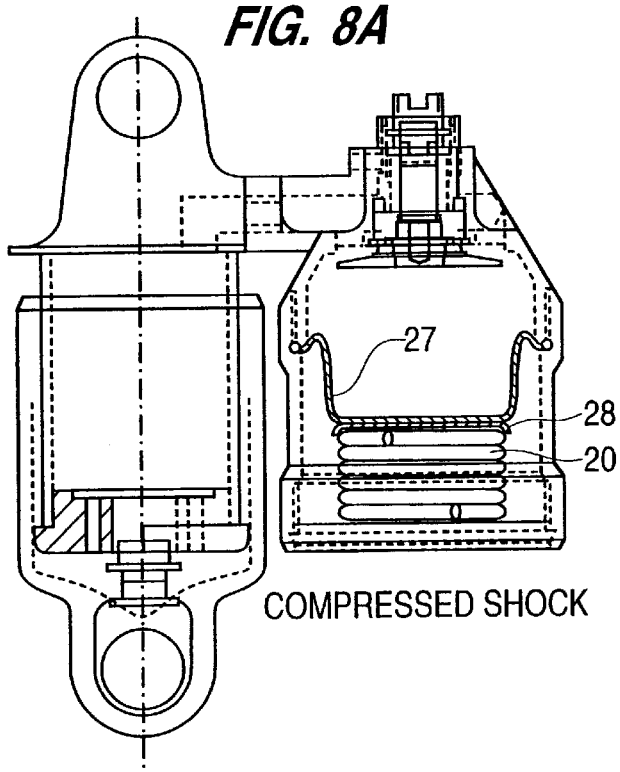
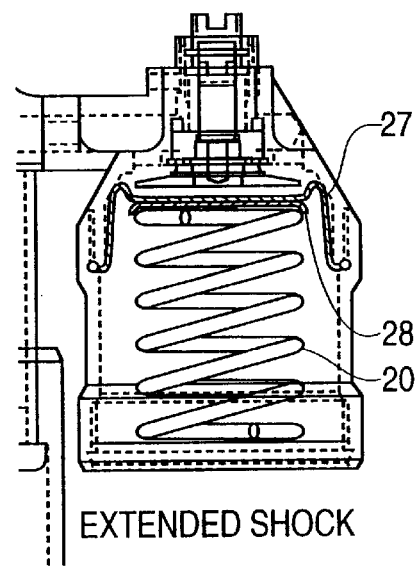
FIG. 8A COMPRESSED SHOCK
FIG. 8B EXTENDED SHOCK
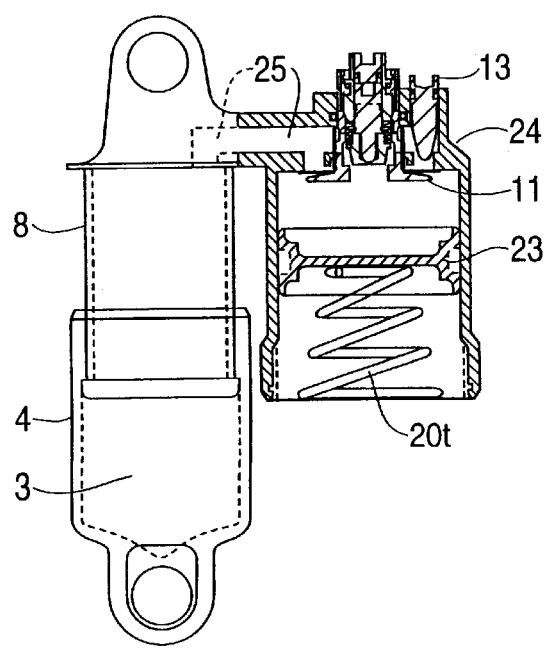
FIG. 9

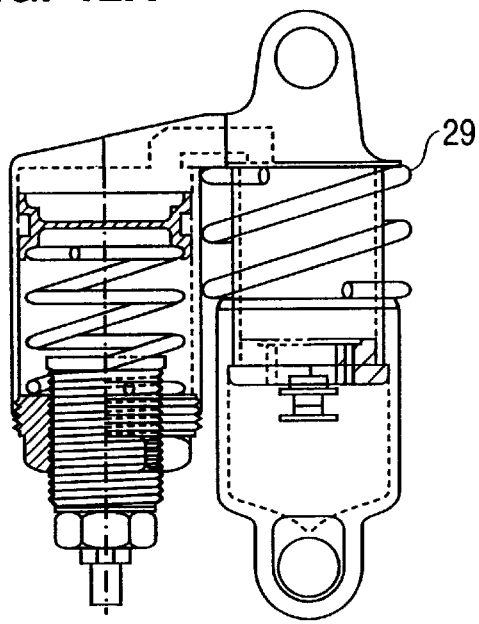
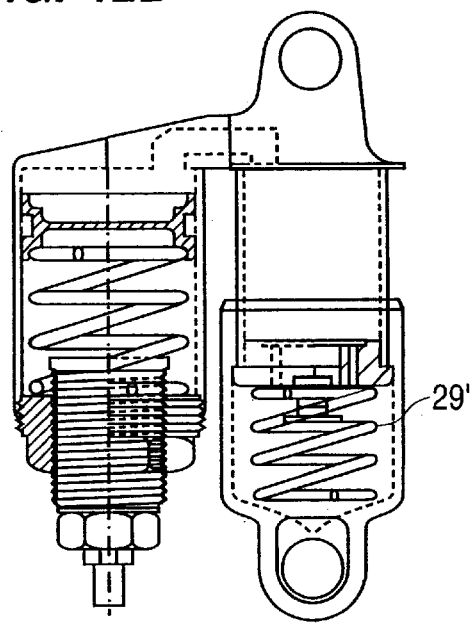
FIG. 12A  FIG. 12B
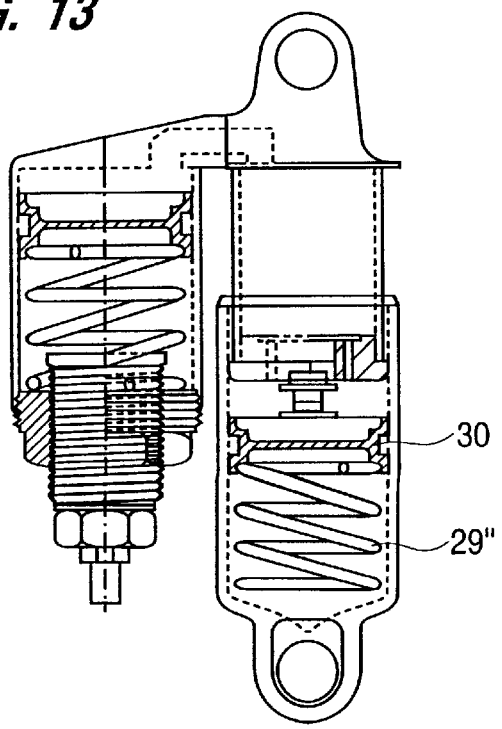
FIG. 13

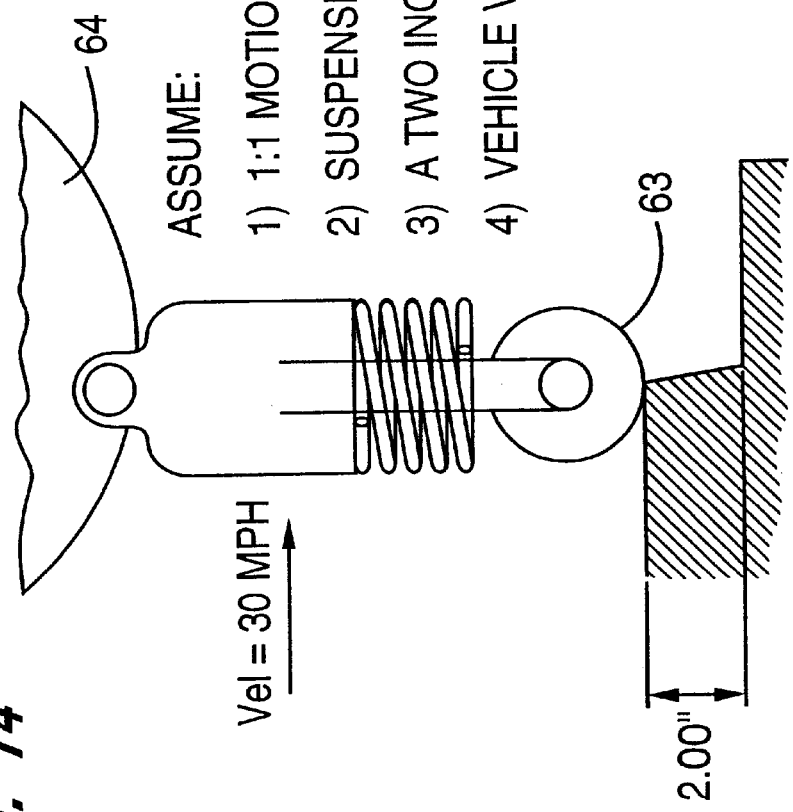

HYDRAULIC SUSPENSION UNIT

FIELD OF THE INVENTION

The present invention is directed to an improved hydraulic suspension unit for a vehicle and to a lightweight vehicle such as a bicycle or motorcycle employing the same.

BACKGROUND AND SUMMARY OF THE INVENTION

There are many problems extant with current state of the art suspension units, whether they be for bicycles, motorcycles, four-wheel vehicles, on or off road. The shock designer must constantly weigh the relative importance of handling, control and ride comfort, and decide which direction to compromise the suspension performance toward the vehicle's intended use. The only way to avoid these compromises would be to have a suspension that could anticipate every motion, and act to resist or comply instantaneously. While many attempts have been made at developing a computer controlled suspension that will do just that, none are able to achieve such a result. An object of the present invention is to reduce these compromises without requiring the use of a computer or electrical components.

In the past, springing means and methods have been the first in line for compromise during the process of specifying suspension components for a given vehicle. Too stiff a spring rate prevents the suspension from using enough travel to cope with bumps or surface irregularities, and transmits a harsh ride, as well as reduced cornering grip and traction under these conditions. Too soft a spring rate and the ride motions become excessive and weight transfer induces large shifts in the attitude of the chassis during braking and cornering. Excessive bottoming can also occur. This compromise has been further complicated in light vehicles such as motorcycles and bicycles, where rider weight is a relatively large percentage of the total sprung weight of the vehicle. For example, rider weight can be over 90% of total sprung weight in the case of a bicycle. With such a vehicle, a single spring rate will not be well suited for all rider weights. The skill level of the rider or operator of the vehicle is also a consideration when selecting a spring rate.

There is a need for an improved hydraulic suspension unit which provides a more flexible springing medium with more tuning capability, which can be adjusted without resorting to physically changing components. An object of the present invention is to provide such a hydraulic suspension unit.

Another compromise made with conventional shock absorbers is the amount of rebound damping. With conventional shock absorbers, there is always a damping effect present, even if this damping is undesirable. Too much rebound damping can cause harshness in the ride as the suspension skips off the tops of bumps rather than allowing the wheel to follow the surface into a depression. In a succession of bumps this can lead to loss of control as the wheel fails to return to full extension before hitting the next bump, meaning less available travel to negotiate the next bump, and more importantly, since the spring will be compressed whenever the shock is not at full extension, it will provide a higher force to resist the upward movement of the wheel upon hitting the next bump. This problem is usually described as "packing down". Too little rebound damping can cause an uncomfortable ride, by allowing too much upward movement of the vehicle after hitting bumps, or due to weight transfer in cornering, braking or accelerating. Too little rebound damping can also allow excessive cycling of the suspension after these inputs, as the spring's energy remains undamped, and is returned to the spring. Another problem is that too little rebound damping can cause the vehicle to launch skyward after large impacts, or when leaving the face of a jump. This launching effect is caused when the suspension reaches full compression, maximizing the stored energy in the spring, which is then returned at a high velocity, due to inadequate rebound damping.

There is a need for an improved hydraulic suspension unit which overcomes these drawbacks and disadvantages of the conventional suspension unit with respect to rebound damping. An object of the present invention is to provide an improved hydraulic suspension unit which solves these problems.

Compression damping is another area which has been compromised in the construction of conventional hydraulic suspension units. A vehicle with excessive compression damping will feel very responsive to control inputs, sometimes aiding handling by increasing control. This is usually at the expense of cornering grip or traction, as the wheel is unable to react quickly enough to even minor surface imperfections, much less bumps or major impacts and the contact pressure between the tire and terrain surface will be less consistent. When encountering a large bump, too much compression damping prevents the wheel from moving up over the bump quickly enough, thus translating impact to the chassis. Conversely, too little compression damping places too much reliance on the springing means for purposes of resisting excessive suspension compression due to weight transfer caused by cornering, braking, accelerating or bottoming forces. This can cause unwanted ride motions, as well as hard metal-to-metal impact on severe bottoming.

There is a need for an improved hydraulic suspension unit which addresses the conflicting requirements it is asked to fill with respect to compression damping. These include controlling the onset of initial ride motions, whether initiated by terrain changes or control inputs, and limiting the maximum velocity allowed in compression thus preventing harsh metal-to-metal bottoming. It is also desired that compression damping be accomplished while minimizing the transmission of bump impacts to the chassis. An object of the present invention is to provide an improved hydraulic suspension unit for a vehicle which addresses these conflicting requirements it is asked to fill.

These and other objects are attained by the improved hydraulic suspension unit for a vehicle of the present invention, the suspension unit comprising first and second members arranged in telescoping relation with one another for relative movement along a longitudinal axis of the suspension unit responsive to the relative motions between a vehicle wheel and the vehicle body compressing and extending the suspension unit. Means containing a hydraulic liquid are provided. The containing means include a first chamber containing hydraulic liquid in compressive force transmitting relation between the first and second members. The volume of the first chamber is decreased and increased with relative movement of the first and second members toward and away from one another along the longitudinal axis, respectively.

The containing means further includes a reservoir containing hydraulic liquid and passage means connecting the first chamber and the reservoir to permit the flow of hydraulic liquid between the first chamber and the reservoir. The reservoir includes a movable wall which can be moved back and forth to increase and decrease the volume of the reservoir as a function of the hydraulic liquid flowing to and from the reservoir, respectively.

The suspension unit further comprises spring means for resiliently biasing the movable wall against the hydraulic liquid in the reservoir with a force which is a function of the amount of movement of the spring means and in turn the position of the movable wall and volume of the reservoir. The spring means stores energy upon movement of the movable wall increasing the volume of the reservoir with the flow of hydraulic liquid to the reservoir. Stored energy is released by the spring means upon movement of the movable wall decreasing the volume of the reservoir with the flow of hydraulic liquid from the reservoir to the first chamber.

Compression damping means are provided for damping the flow of hydraulic liquid from the first chamber to the reservoir when the suspension unit is compressed to cause relative movement of the first and second members toward one another along the longitudinal axis decreasing the volume of the first chamber. Rebound damping means are also provided for damping the flow of hydraulic liquid to the first chamber resulting from the spring means releasing energy stored therein by moving the movable wall to decrease the volume of the reservoir and flow hydraulic liquid from the reservoir to the first chamber for extending the suspension unit. The rebound damping means allows relative movement of the first and second members away from one another for extending the suspension unit by external forces on the suspension unit without resistance from the rebound damping means while continuing to damp the flow of hydraulic liquid to the first chamber from the reservoir resulting from release of stored energy of the spring means. The rebound damping means includes a rebound damping valve which is movable in response to pressure of the hydraulic liquid thereon for opening and closing the passage means from the reservoir to the first chamber during release of stored energy from the spring means.

In order to provide a more flexible spring means with more tuning capability, the spring means of the suspension unit may be any combination of air, coil or elastomer springs, which can be separately adjusted for preload, providing maximum tuning flexibility without resorting to physically changing components. In a disclosed embodiment of the suspension unit, the spring means includes a pressurized gas arranged in an enclosed space in the suspension unit for acting on the movable wall of the reservoir. A coil spring acting on the movable wall can also be provided in the enclosed space containing the pressurized gas. Means are also provided for separately adjusting a preload or spring characteristic of each of the gas spring and the coil spring of the spring means.

A further feature of preferred embodiments of the suspension unit is that the passage means directs all of the flow of hydraulic liquid from the first chamber to the reservoir via the compression damping means and directs all of the flow of hydraulic liquid from the reservoir to the first chamber via the rebound damping means. Forcing 100% of the shock fluid displaced by extension or compression of the suspension unit through a single path, through the rebound damping means or through the compression damping means, allows more accurate and consistent damping control. The spring means is arranged to act directly on the movable wall of the reservoir, causing the fluid pressure to act on the cross-sectional area of the shock shaft forcing the shock to extend or resist compression. The movable wall may take the form of a reservoir piston, a resilient bladder or a flexible diaphragm. With this arrangement, the spring force and rebound damping have a direct relationship with each other that allows unique manipulation capabilities of their interaction.

By properly selecting the shaft/reservoir diameter ratio, the spring means, whether air, steel or elastomer, can have a mechanical advantage (or disadvantage) when acting on the shock shaft through the reservoir movable wall, allowing flexible packaging.

The maximum speed of expansion of the suspension unit due to release of stored energy from the spring means is controlled according to the invention by means for adjustably limiting the maximum flow area for hydraulic liquid flowing past the rebound damping valve from the reservoir to the first chamber when the rebound damping valve is open. This means for adjustably limiting the maximum flow area in a disclosed embodiment includes a mechanical stop limiting the opening extent of the rebound damping valve, and externally accessible means for adjusting the position of the stop.

Control of the hydraulic liquid pressure necessary for opening the rebound damping valve to permit the flow of hydraulic liquid from the reservoir to the first chamber and release of stored energy of the spring means is accomplished according to the invention by externally accessible means for adjustably, resiliently biasing the rebound damping valve in a closed position. In one form of the invention, the rebound damping valve is a poppet valve. The externally accessible means for adjustably, resilienting biasing includes a coil spring and means for adjusting a preload on the coil spring resiliently biasing the poppet valve in the closed position.

A performance characteristic of the hydraulic suspension unit of the present invention is that the rebound damping valve only affects the rebound velocity when such velocity is due to the force imparted by the spring means when it is returning stored energy after some initial compression. The magnitude of the stored energy can vary greatly and can be simply due to the force needed to support the static, sprung weight of the vehicle, or to the further compression of the suspension due to cornering, braking, bumps or other terrain variations. The extension, or rebound velocity of the shock is not effected or resisted by the shock absorber, if the rebound motion is due to external forces extending the shock or suspension. For example, if one end of the vehicle were to be lifted suddenly by skyhooks, the suspension unit of the present invention would not resist the immediate downward movement of the wheels as they come off the ground.

This effect allows the wheels to the extension limit of the suspension unit to follow small or large depressions in the surface of the terrain, maintaining traction and control, yet during any movement involving the return of stored energy from the spring, full rebound control is always attained. Suspension geometry can also cause forces to extend the shock absorber, as in certain anti-dive or anti-squat applications. These forces are also allowed to extend the suspension unit to its extension limit without the resistance of damping. The feature permitting external adjustment of the rebound damping characteristics makes the suspension unit of the invention particularly suited for use in lightweight vehicles such as bicycles and motorcycles where the rider weight is a relative large percentage of total sprung weight of the vehicle. However, the use of such a feature is not necessary to realize improved performance and the suspension unit of the invention is also useful in other vehicles.

A compression damping means in the disclosed embodiments includes a compression damping valve which is movable in response to pressure of the hydraulic liquid thereon for opening and closing the compression damping valve for controlling the flow of hydraulic liquid from the first chamber through the passage means to the reservoir during compression of the suspension unit. Means are also provided for adjustably biasing the compression damping valve in its closed position for controlling the hydraulic pressure and hence compressive force on the suspension unit necessary for opening the compression damping valve to permit the flow of hydraulic liquid from the first chamber through the passage means to the reservoir and the compression of the suspension unit. The compression damping valve is in the form of a flexible disc in the disclosed embodiments. The means for adjustably biasing applies an adjustable preload on the disc to affect the hydraulic pressure necessary to deflect the disc and open the compression damping valve.

The maximum speed of compression of the suspension unit is controlled by adjustably limiting the maximum flow area for hydraulic liquid flowing from the first chamber to the reservoir when the compression damping valve is open. An adjustment means for this purpose in a disclosed embodiment includes a mechanical stop limiting the opening extent of the compression damping valve, and externally accessible means for adjusting the position of the stop.

In one embodiment of the invention, the means for adjustably limiting the maximum flow area includes an additional valve located in the passage means upstream of the compression damping valve with respect to the flow of hydraulic liquid from the first chamber to the reservoir. Externally accessible means are provided for adjusting the extent which the additional valve restricts the flow of hydraulic liquid in the passage means during compression of the suspension unit. In the disclosed embodiment this additional valve is in the form of a needle valve. Thus, externally accessible means are provided for independently adjusting the amount of damping provided by each of the compression damping means and the rebound damping means.

Another feature of the invention is that each of the compression damping means and the rebound damping means of the hydraulic suspension unit acts as a check valve against the flow of hydraulic liquid in the opposite direction than that which is damped thereby. Further, the rebound damping valve is preferably arranged for movement so as to displace hydraulic liquid on the first chamber side of the rebound damping valve during opening of the valve. The volume of the rebound damping valve and its linear travel during opening are selected to provide displacement of a predetermined volume of hydraulic liquid and hence a predetermined expansion of the suspension unit during opening of the valve.

These and other objects, features and advantages of the present invention will become more apparent from the following description when taken in connection with the accompanying drawings which show, for purposes of illustration only, several embodiments in accordance with the present invention.

BRIEF DESCRIPTION OF THE DRAWINGS

FIG. 8A is a side view, partially in cross-section through longitudinal center axes of a shock body with shock shaft and a reservoir body of a hydraulic suspension unit according to a fifth embodiment of the invention, the suspension unit having a diaphragm separator as a movable wall of the reservoir, and the suspension unit being shown in a compressed position;

FIG. 8B is a side view of a portion of the suspension unit as shown in FIG. 8A depicting the suspension unit in an extended position;

FIG. 9 is a side view, partially in cross-section through a longitudinal center axis of a reservoir body of a hydraulic suspension unit according to a sixth embodiment of the invention, the suspension unit having a rebound damping valve and compression damping valve arranged in the upper end of the reservoir body with four-way, external adjustment thereof being provided;

FIG. 12A is a side view, partially in cross-section through longitudinal center axes of a hydraulic suspension unit like that depicted in the embodiment of FIG. 1, further provided with an external auxiliary spring acting to extend the shock without forcing hydraulic liquid through the rebound damping valve;

FIG. 12B is a side view, partially in cross-section along longitudinal center axes of a suspension unit like that of FIG. 1 but with an internal auxiliary spring being provided in a chamber of the shock body containing hydraulic liquid to extend the shock without forcing hydraulic liquid through the rebound damping valve;

FIG. 13 is a side view, partially in cross-section through longitudinal axes of a suspension unit similar to the suspension unit of FIG. 1 but with an internal auxiliary spring and an auxiliary divider piston being provided to extend the shock without forcing hydraulic liquid through the rebound damping valve; and FIG. 14 is a schematic illustration of a hydraulic suspension unit between a wheel and the body of a vehicle, the wheel traveling along a surface having a two inch drop.

DETAILED DESCRIPTION OF THE DISCLOSED EMBODIMENTS

Figure 1:
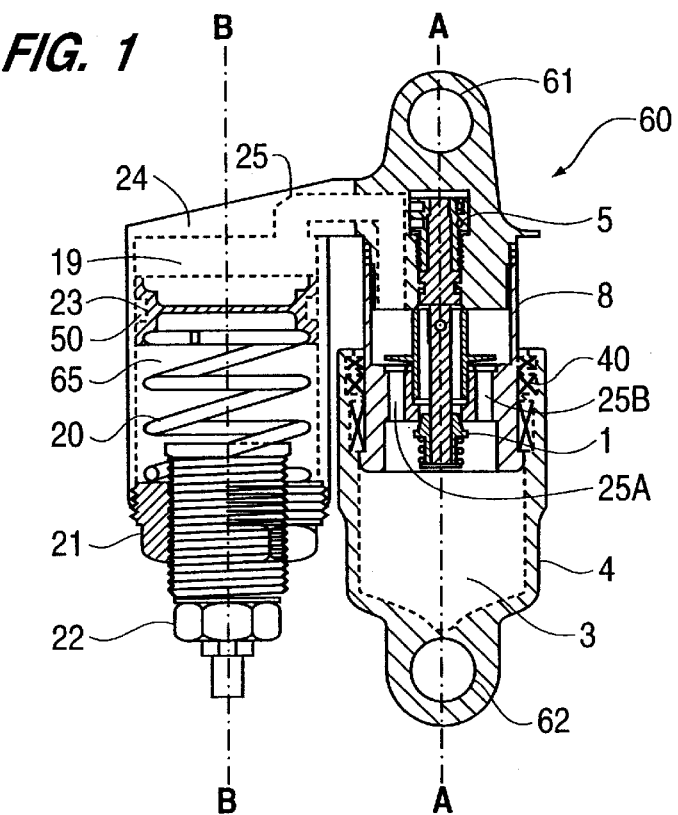
FIG. 1 is a side view in cross-section along the longitudinal center axes A—A and B—B of the shock body with shock shaft and reservoir body, respectively, of a hydraulic suspension unit according to a first embodiment of the invention.
Figure 2A:
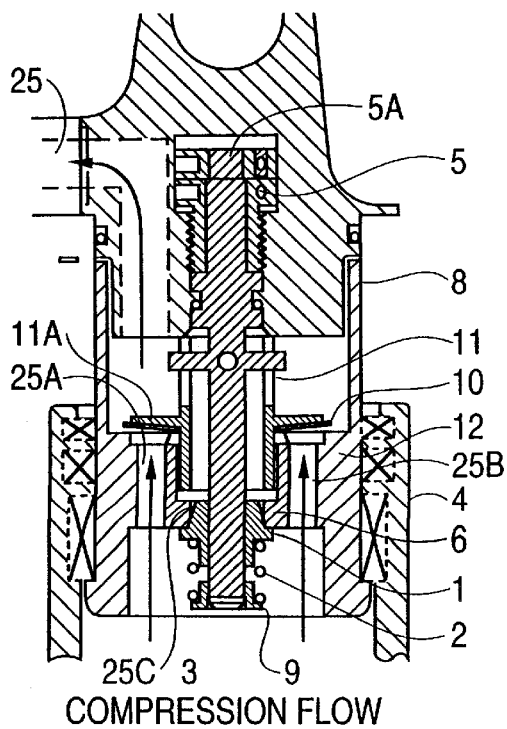
FIG. 2A is an enlarged view of a portion of the shock body with shock shaft of the suspension unit of FIG. 1 during compression flow.
Figure 2B:
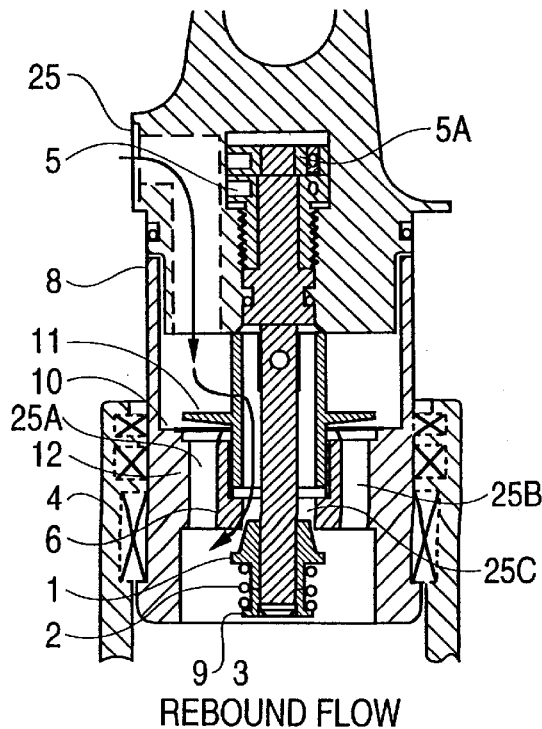
FIG. 2B is an enlarged view of a portion of the shock body with shock shaft of the suspension unit of FIG. 1 during rebound flow.

Referring now to the drawings, a hydraulic suspension unit 60 according to a first embodiment of the invention is depicted in FIGS. 1, 2A and 2B. The suspension unit 60 comprises first and second members in the form of a shock body 4 and a shock shaft 8 arranged in telescoping relation with one another for relative movement along a longitudinal axis A—A of the suspension unit responsive to relative motions between a wheel of a vehicle and the vehicle body compressing and extending the suspension unit. Apertures 61 and 62 at the upper end of the shock shaft 8 and the lower end of the shock body 4, respectively, permit connection of the suspension unit between a vehicle body 64 and a wheel 63 thereof in the manner shown schematically in FIG. 14. The shock body 4 and shock shaft 8 in FIG. 1 are shown in an extended position of the suspension unit.

A hydraulic liquid such as oil is contained in the suspension unit 60 within a first, interior chamber 3 in the shock body 4 where the hydraulic liquid is in compressive force transmitting relation between the shock shaft 8 and shock body 4. The volume of the interior chamber 3 is decreased and increased with relative movement of the shock shaft and shock body toward and away from one another along the longitudinal axis A—A. A fluid passage 25 in the shock shaft 8 and a reservoir body 24 connects the interior of chamber 3 with a hydraulic liquid reservoir 19 in the reservoir body 24. The reservoir 19, passage 25 and chamber 3 are filled with the hydraulic liquid. The reservoir includes a movable wall in the form of a piston 23 which can be moved back and forth along the axis B—B of a cylinder defined within the reservoir body 24 to increase and decrease the volume of the reservoir 19 as a function of the volume of hydraulic liquid flowing to and from the reservoir with a decrease or increase in the volume of chamber 3 upon compression or expansion of the suspension unit. A sealing arrangement 40 is provided between the shock body 4 and the shock shaft 8.

The piston 23 is resiliently biased against the hydraulic liquid in the reservoir 19 by a spring formed by a coil spring 20 and a pressurized gas, air for example, located within an enclosed space 65 on the lower side of the piston 23 in reservoir body 24 as depicted in FIG. 1. A seal 50 is provided between the outer periphery of the piston 23 and the wall of the cylinder in the reservoir body 24 for effectively separating the pressurized air and the hydraulic liquid on respective sides of the piston 23 without restricting movement of the piston in the cylinder.

The spring formed by coil spring 20 and the pressurized air in the enclosed space 65 resiliently biases the piston 23 with a force which is the function of the amount of movement, e.g. compression of the spring 20 and the volume of enclosed space 65 and in turn the position of the piston 23 and the volume of the reservoir 19. That is, the spring stores energy upon movement of the piston 23 in response to pressurized hydraulic liquid increasing the volume of the reservoir 19 with the flow of hydraulic liquid to the reservoir from compression of the shock due to an increase in compressive force on the suspension unit. When this force or load on the suspension unit is reduced, the spring releases its stored energy by moving the piston 23 upward to decrease the volume of the reservoir 19 with the flow of hydraulic liquid from the reservoir to the interior chamber 3 by way of fluid passage 25 thereby expanding the suspension unit to restore a balance of force on the hydraulic liquid in the suspension unit from the external load on the suspension unit and the force of the spring-loaded piston 23.

Figure 3:
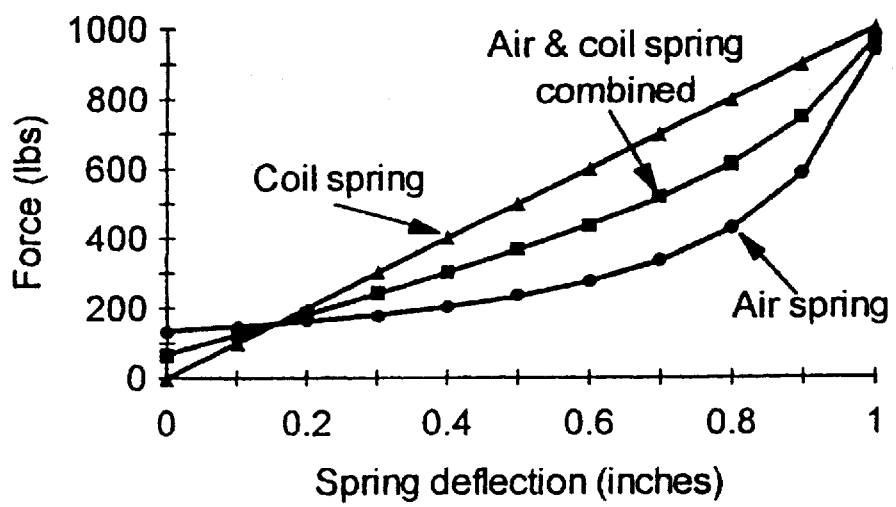
FIG. 3 is a graph of force versus deflection for various springs, namely an air spring, a coil spring and a combined air and coil spring.
Figure 6:
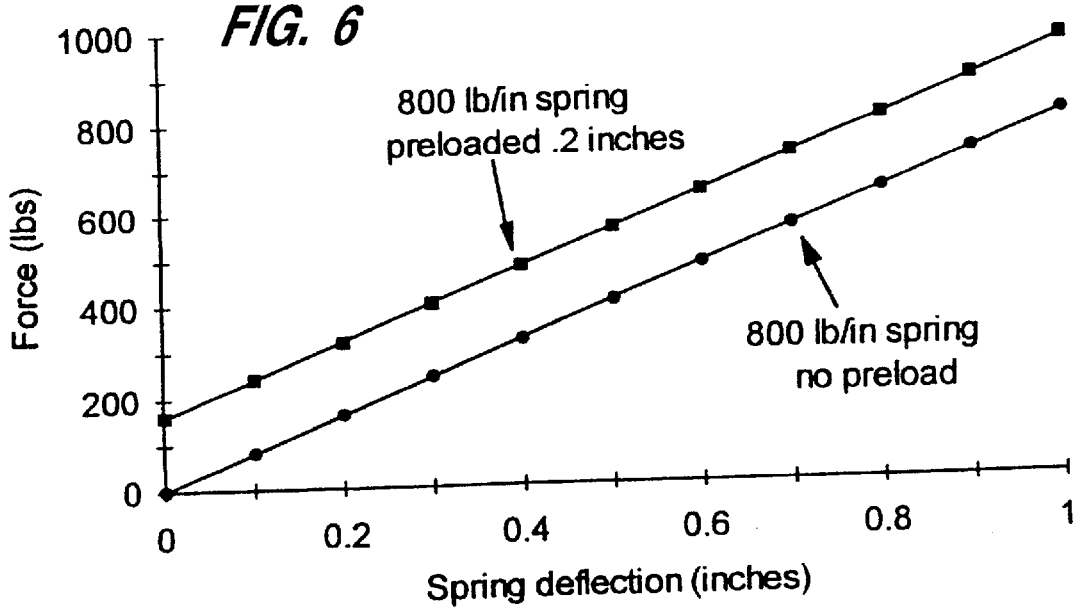
FIG. 6 is a graph of force versus spring deflection showing the effects of spring preload.

By using a combination of spring media, it is possible to have an infinite number of adjustment combinations. The linear rate of the steel coil spring 20 is combined with the rising rate characteristic of the pressurized air as shown in FIG. 3. Tuning flexibility with respect to the spring rate of the combination of springing media is achieved by providing adjustment for each of the spring media. For coil spring 20, coil spring preload adjuster 21 allows an adjustable preload to be applied to the coil spring 20 by rotating the threaded preload adjuster 21 threadedly received in the end of the reservoir body 24 to define an end of enclosed space 65. FIG. 6 illustrates the effects of spring preload on the force versus deflection curve of coil spring 20. The characteristic for the 800 pounds/inch coil spring with no preload is compared with that for the spring preloaded 0.2 inch, that is by advancing preload adjuster 21 into the reservoir body 24 a distance of 0.2 inch along the axis B—B thereby compressing and preloading the coil spring.

Figure 7:
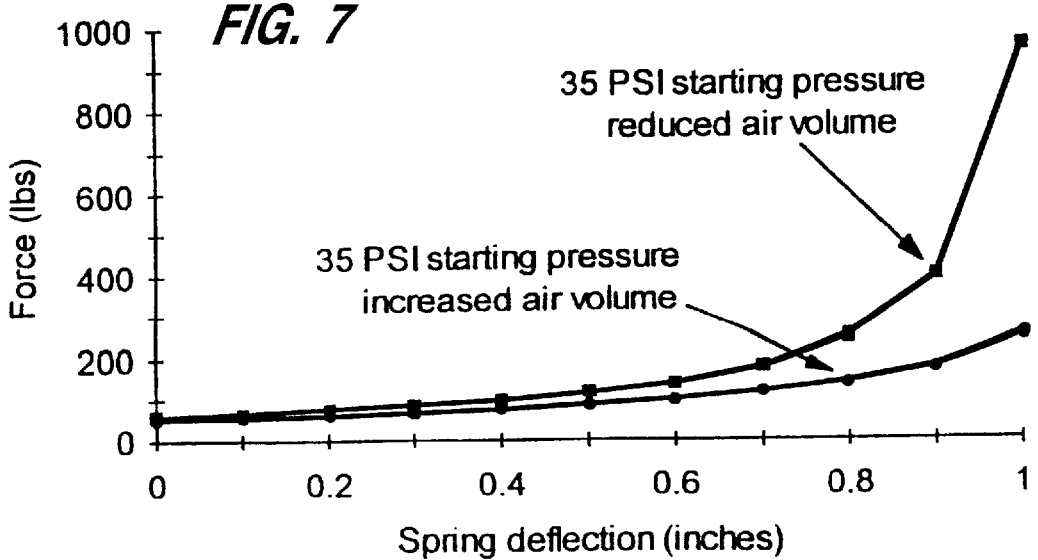
FIG. 7 is a graph of force versus spring deflection showing the effects of air volume changes on spring rate.

The same type of adjustment is provided for the air spring by air volume adjuster 22 for changing the air volume within the enclosed space 65 by threadedly moving the adjuster 22 with respect to the preload adjuster 21 and enclosed space 65. This enables a change in the rate of progression of the air spring as deflection increases. The effects of changes in the rate of progression of the air spring due to variations in the available air volume are shown in FIG. 7.

Figure 4A:
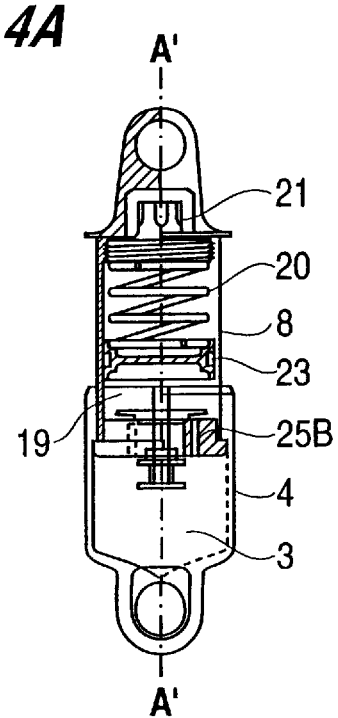
FIG. 4A is a side view, partially in cross-section through a longitudinal center axis C—C of a hydraulic suspension unit according to a second embodiment of the invention.
Figure 4B:
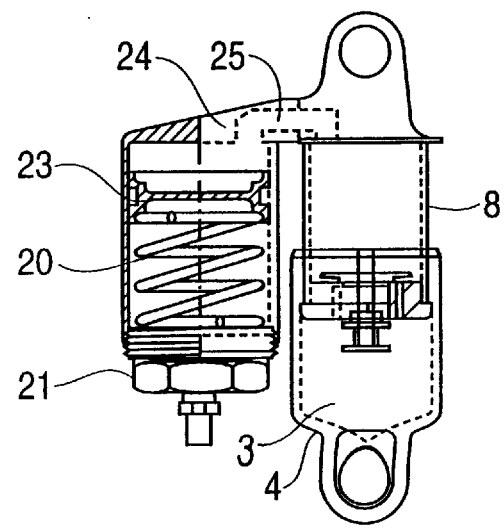
FIG. 4B is a side view, partially in cross-section through longitudinal center axes of the shock body with shock shaft and the reservoir body of a hydraulic suspension unit according to a third embodiment of the invention.
Figure 5:
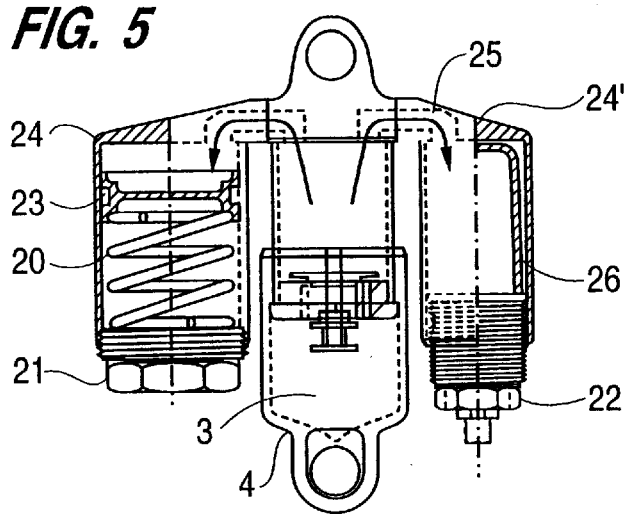
FIG. 5 is a side view, partially in cross-section through longitudinal center axes of the shock body with shock shaft and each of dual reservoirs of a hydraulic suspension unit according to a fourth embodiment of the invention.

Thus, in the embodiment of FIG. 1, for packaging and tuning flexibility, both the coil spring and air spring are packaged in the same reservoir with dual, coaxial adjusters for the respective springs. However, two or more of the aforementioned springs can be arranged in respective reservoir bodies 24 and 24' as shown in the embodiment of FIG. 5. Also, as shown in the embodiment of FIG. 9, a tapered spring 20t can be used for more compact packaging and rising rate. An elastomer could also be used in place of the coil spring in these embodiments. In the embodiment of FIG. 4A the reservoir 19, piston 23 and coil spring 20 are arranged within the shock shaft 8 along the axis A'—A' of the suspension unit. The embodiment of FIG. 4B is similar to that in FIGS. 1, 2A and 2B but does not include air valve adjuster 22.

The movable wall of the reservoir 19 in the embodiment of FIG. 1 is in the form of piston 23. However, the movable wall could have other forms, such as a resilient bladder 26 formed of rubber, for example, as in the reservoir body 24' in the embodiment of FIG. 5, or a flexible diaphragm 27 as in the embodiment of FIGS. 8A and 8B. This fluctuating diaphragm 27 is advantageous in that it will have a quicker response to all inputs, avoiding a loss of sensitivity common with a divider piston, or to a lesser degree with a rubber bladder. The high sensitivity possible to even the smallest inputs offers improved ride characteristics and handling.

The diaphragm 27 in the embodiment of FIGS. 8A and 8B consists of a molded rubber or rubberized material arranged to lie in a torus shape when at the extremes of its travel. The center of the diaphragm 27 consists of a circular disc 28 made of metal or other stiff material. If used with a coil or elastomer spring, a coil 20 is shown in FIGS. 8A and 8B, the periphery of the disc 28 may be turned as shown, to a dish shape, to provide a means for centering the spring.

The hydraulic suspension unit 60 of the present invention further comprises compression damping means for damping the flow of hydraulic liquid from the first chamber 3 to the reservoir 19 when the suspension unit is compressed to cause relative movement of the shock body 4 and shock shaft 8 towards one another along the longitudinal axis A—A decreasing the volume of the first chamber 3. In the embodiment of FIGS. 1, 2A and 2B, the compression damping means includes a compression damping valve in the form of a disc 10 which is movable in response to pressure of the hydraulic liquid thereon for opening and closing passages 25A and 25B of the fluid passage 25 in a valve body 12 of the shock shaft 8. As shown in FIGS. 1, 2A and 2B, in order for the shock absorber of the suspension unit 60 to compress, the pressure of the hydraulic liquid in the chamber 3 must rise to the extent that it can deflect the disc 10 allowing the liquid to flow past, and into the reservoir 19, thus compressing the spring. By means of a compression damping adjuster 11 threaded into the valve body 12, a preload on the disc 10 can be increased, thus increasing the pressure necessary to deflect the disc 10, to allow the shock to move. Since this controls the initial force necessary to compress the shock, it serves as an effective way to control the compression damping that occurs at low shock shaft velocities.

In the extreme, the adjuster 11 can be configured so that, at the limit of adjustment, the disc 10 will be clamped between the adjuster 11 and the valve body 12, thus preventing any deflection of the disc. In this condition, the shock absorber can not be compressed, as it is no longer possible for liquid flow to occur, hydraulically locking the shock absorber. The adjustment is effected in the embodiment of FIGS. 1, 2A and 2B by turning the adjuster shaft with knob 5A connected thereto which in turn rotates adjuster 11 in valve body 12 by projections 5B on the shaft engaged in slots in adjuster 11.

High speed compression damping and adjustment thereof are attained by a manipulation of the total amount of flow area allowed under compression. By limiting the total flow area, an orifice effect can be created, through which compression forces can increase exponentially with shaft velocities, thereby allowing precise control over shaft velocities. These effects are achieved in the embodiment of FIGS. 1, 2A and 2B, by limiting the total amount of deflection of the disc, with an annular mechanical stop 11A incorporated into the compression damping adjuster 11. Thus, the disc is still allowed to deflect in response to low shock shaft velocities, but shaft velocities can be limited by the orifice effect created. A poppet type valve can also be used, with an initial spring preload, and a travel limit, to control maximum flow area.

Figure 10A:
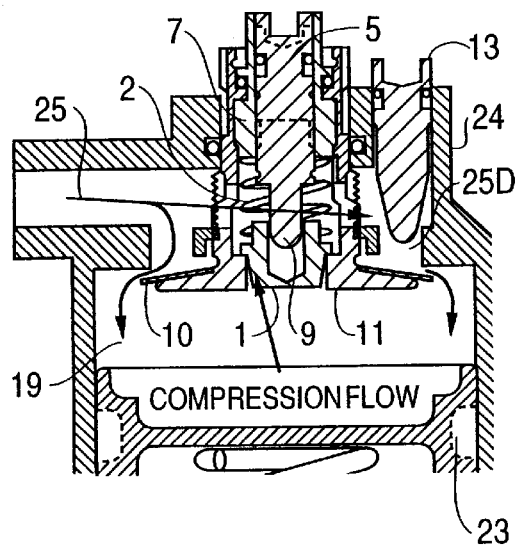
FIG. 10A is an enlarged view of a portion of the suspension unit of FIG. 9 during compression flow.
Figure 10B:
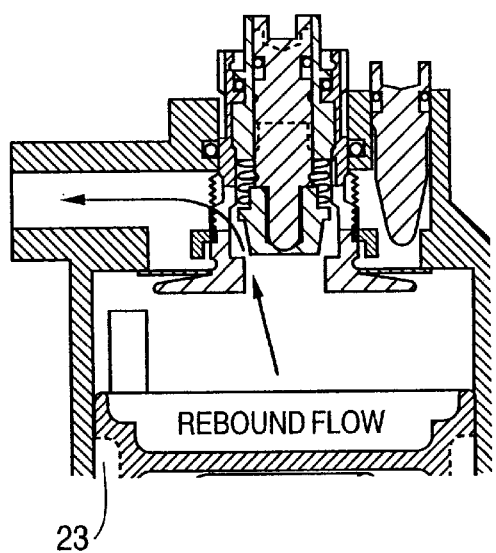
FIG. 10B is an enlarged view of a portion of the suspension unit of FIG. 9 during rebound flow.

While the foregoing means of controlling the high speed shaft movements of the suspension unit during compression can be effective, an additional feature of the invention depicted in the embodiment illustrated in FIGS. 9, 10A and 10B allows for much finer adjustment capabilities, and more independent control of high speed shaft movements during compression. This is accomplished using an adjustable orifice or needle valve 13, inserted into the compression flow path 25D leading to the disc 10 and reservoir 19. With this arrangement, the effect of the high speed adjustment remains independent from the effects of the low speed adjustment. As the hydraulic liquid is forced into the reservoir 19 through passage 25D, it must first pass through the orifice needle valve 13, before it can deflect the compression disc 10 and compress the spring means. If the shock shaft movement is below a certain velocity, the needle valve 13 cannot present enough of a flow restriction for the small flow volume, and therefore has no effect on the damping force. This leaves the disc 10 to be responsible for providing damping force, as it must deflect in order for any shaft movement to occur. As shaft velocity increases, the compression disc 10 remains deflected and flow increases until the needle valve 13 does become a flow restriction, thereby creating damping force at those shaft velocities. If the needle valve 13 is threaded into the reservoir body 24, rotation causes the valve to translate, thus varying the available flow area, and subsequently, the high speed damping force.

The hydraulic suspension unit 60 according to the embodiment of the FIGS. 1, 2A and 2B further comprises rebound damping means in the form of rebound valve 1, a poppet type valve, and a cooperating rebound valve seat 6 formed in the valve body 12. The rebound damping means damps the flow of hydraulic liquid to the first chamber 3 resulting from the spring means releasing energy stored therein by moving the piston 23 to decrease the volume of the reservoir 19 and flow hydraulic liquid from the reservoir to the first chamber for extending the suspension unit. The rebound damping means allows relative movement of the shock body 4 and shock shaft 8 away from one another along the axis A—A for extending the suspension unit to the extension limit by external forces on the suspension unit without resistance from the rebound damping means while continuing to damp the flow of hydraulic liquid to the first chamber 3 from the reservoir 19 resulting from release of stored energy of the spring means. The rebound damping valve 1 is movable in response to pressure of the hydraulic liquid thereon for opening and closing the passage 25C at the rebound valve seat 6 for controlling the flow of hydraulic liquid through the fluid passage 25 from the reservoir 19 to the first chamber 3 during release of stored energy from the spring means formed by the coil spring 20 and the pressurized air in enclosed space 65.

The primary function of rebound damping with rebound valve 1 is to dampen the return of energy that has been stored by the springing media, coil spring 20 and the pressurized air in enclosed space 65, due to compression of the spring. As the suspension is compressed further, more energy is stored which must be released as soon as possible. Therefore the rebound damping valve 1 is preferably of a type that, knowing the maximum possible energy stored in any given springing system, should be able to limit the rebound shaft velocity to a known maximum, for a known spring and known vehicle sprung weight (since that is what the returning energy must push against). This maximum rebound velocity can be calculated based on the maximum desirable upward acceleration of the sprung weight or it can be based on empirical data, choosing a maximum velocity that does not create uncomfortable ride motions, or allow a dangerous recoil. With conventional shocks, setting the rebound damping in this way would create the "packing down" phenomena described earlier as the rebound damping would be too high to allow the wheel to return fast enough for multiple bumps.

A suspension unit of the present invention is able to utilize the aforementioned type of rebound damping, without suffering from "packing down". The rebound damping means of the suspension unit of the present invention is configured, in combination with the springing means, to allow the wheel to fall when it is unloaded, such as when encountering a depression, without impeding the shaft velocity with rebound damping resistance. In other words, it will allow the wheel to fall solely under the influence of the mass being attracted by gravity, even if that rate is faster than the spring can extend the shock against the force of the rebound damping. This falling of the wheel is possible while retaining the ability to limit rebound velocity against spring force, as described earlier.

The rebound valve 1 is configured so that the hydraulic liquid flow in the rebound direction can only take place if the liquid can push the poppet type rebound valve 1 against pressure from a rebound spring 2. The maximum opening or flow rate of this valve is used to limit the maximum rebound velocity of the shock shaft from release of stored energy by the spring means. As the spring means pushes directly on the hydraulic liquid, and thus the rebound valve 1, no cavitation can occur, and precise control of the spring energy is realized. In the event that the wheel encounters a sudden depression, the weight of the wheel and suspension will attempt to fall freely, unless resisted by rebound damping. With the present invention, the rebound valve 1 remains closed momentarily, as a temporary vacuum is allowed to form on the downstream side of the rebound valve 1, in chamber 3 created by the surrounding shock body 4. The formation of this vacuum allows the wheel to fall freely, resisted only by the negligible force of the vacuum force itself trying to retract the shock, and the initial cling/shear properties of the hydraulic liquid on the internal surfaces of chamber 3. This allows the wheel to follow the terrain surface more accurately, resulting in better traction, better cornering grip and control. The free fall of the wheel and the resultant formation of this vacuum all take place in a fraction of a second. Thus, the existence of the vacuum is fleeting as the rebound valve 1 starts to flow oil and begins to fill chamber 3.

The rebound valve 1 is provided with an external adjustment, threaded rebound adjuster 5, which can be rotated external to the shock absorber, causing it to translate in the shock body for varying the maximum orifice flow area of the valve 1 and thus the maximum allowable rebound velocity. This translation moves a travel limiting stop 9 for the rebound valve 1, and thus varies the high speed rebound damping force. At lower rebound shaft velocities, the total flow area available through the valve 1 is not a limiting factor, thus this adjustment has no effect on the low speed rebound damping, or the "free fall" characteristics.

The embodiment disclosed in FIGS. 9, 10A and 10B further includes an additional, separate external adjustment to manipulate the "free fall" characteristics of the shock, as well as the intermediate speed rebound damping force. As mentioned earlier, the pressure of the rebound valve 1 against its seat 6 is controlled by the pressure of the preload spring 2. Once the rebound valve 1 begins to open, intermediate shaft velocities are controlled by the rate of spring 2. Both of these characteristics can be modified by rotating threaded adjuster 7 in the embodiment of FIGS. 9, 10A and 10B. The resultant translation serves to vary the seat pressure and rate rise of spring 2 which results in the adjustability described above. This adjustment can be made externally of the suspension unit.

The suspension unit of the invention then, can be tuned to offer no resistance to the shock being extended provided that the forces trying to extend the shock are externally pulling the shock apart, as in sprung weight (wheel, tire, suspension components) falling due to gravity. Other forces can be created in the suspension geometry to produce external forces that tend to pull the shock apart, i.e. anti-squat or anti-dive. However, if the force trying to extend the shock is the result of the spring means returning stored energy, then this energy will be dissipated with rebound damping as the spring means attempts to flow oil through the rebound valve 1 in order to extend the shock.

When a vacuum is formed in chamber 3, the pressure differential across the rebound valve 1 is increased, encouraging the valve to open to allow oil to displace the vacuum as soon as possible. Thus, the surface area of the rebound valve 1 exposed to the vacuum can be manipulated to modify the additional effect of the pressure differential, when a wheel is unloaded. After the shock is compressed, the spring means will attempt to return its stored energy as described earlier by displacing the rebound valve 1 against pressure from the spring 2. Thus, the area of the rebound valve 1 that is exposed to this pressure, determines the total force (pressure multiplied by area) exerted on the rebound spring 2. However, the rebound valve 1 is preferably configured so that a much larger surface area is exposed to the downstream, or low pressure side of the flow than is exposed to the upstream or high pressure side of the flow. In the disclosed embodiment of FIGS. 1, 2A and 2B, for example, the ratio of exposed downstream surface area to exposed upstream surface area of the rebound valve 1 is about 3:1, but other ratios could be used. Preferably this ratio is at least 1.5:1. Thus, in the presence of the vacuum which forms due to the "free fall" described earlier, this vacuum, while very small in terms of absolute pressure, can act on a relatively large surface area of the rebound valve 1, to create a significant force with which to assist in opening the rebound valve 1 against the force of rebound spring 2, thus reducing the rebound damping force during these conditions and allowing quicker flow of hydraulic fluid returning to the chamber 3 so that the suspension unit is ready in case of impact tending to compress the suspension unit. There is no danger of a dangerous, undamped recoil occurring as the wheel must be unloaded in a free fall condition in order for the vacuum to form. As long as the wheel is unloaded there is nothing for the spring recoil to push against, making it impossible for a recoil force to be imparted to the chassis. Thus, the ratio of surface area exposed to the high pressure side of the flow versus the surface area exposed to the low pressure side of the flow provides another means for automatically modifying the rebound damping characteristics of the shock to suit changing conditions and demands on damping force.

The characteristics of the rebound damping during "no flow" or opening of the rebound valve can also be further enhanced by manipulating the volume and linear travel of the rebound valve 1 itself to provide a precise amount of shock movement in the rebound direction, without offering resistance due to damping, even if the movement is a result of release of spring energy. Due to the design of the rebound valve 1, it can be tuned to allow a small, but exact amount of shock travel, while offering a reduced, but adjustable amount of rebound resistance. This is due to the fact that the rebound valve 1 limits high speed shaft movement by adjusting the orifice size available to flow hydraulic liquid, by limiting its linear travel against the flow of liquid, but for small movements of the valve, there is little or no flow across the rebound valve 1, until the shaft movement is sufficient to displace the entire volume of the rebound valve, and it becomes a flow restriction.

For example, the shock shaft 8 shown in the embodiment of FIGS. 1, 2A and 2B could have a one inch diameter, resulting in a cross-sectional surface area of 0.785 square inch Therefore, any shock shaft movement must be accompanied by an equivalent liquid volume displacement equal to the shaft area times the shaft movement. In this case the rebound valve 1 has a 0.5 inch diameter, and its area is 0.169 square inch. Thus, a 0.1 inch movement of the shock shaft 8 results in a volume displacement of 0.785×0.1=0.0785 cubic inch. The rebound valve 1 has to travel linearly by 0.0785/0.196=0.400 inch, in order to accommodate this movement without offering a flow restriction. Thus, the only resistance, if any, to this small shaft movement, is the pressure from spring 2, which can easily be adjusted in the preferred embodiment.

In this way, the shock absorber can be tuned to allow quicker response to small wheel movements, and such movements themselves can be precisely controlled due to the exact nature of hydraulics, and the ease of adjusting the force from spring 2. Careful selection of the ratio between the diameter and thus area of shaft 8, and the diameter and linear travel of rebound valve 1 allow exact characteristics to be obtained.

Figure 11A:
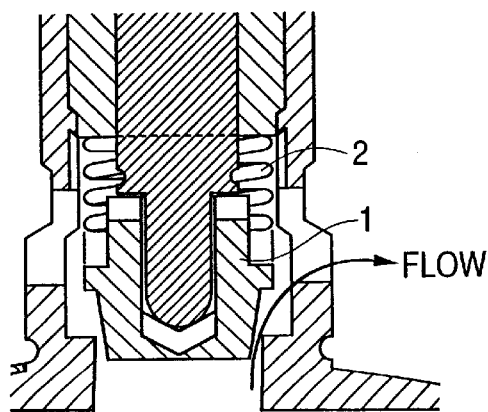
FIG. 11A is an enlarged view of a portion of the rebound damping valve of the embodiment of FIGS. 9, 10A and 10B wherein the valve is configured to allow flow to occur immediately upon any linear displacement thereof.
Figure 11B:
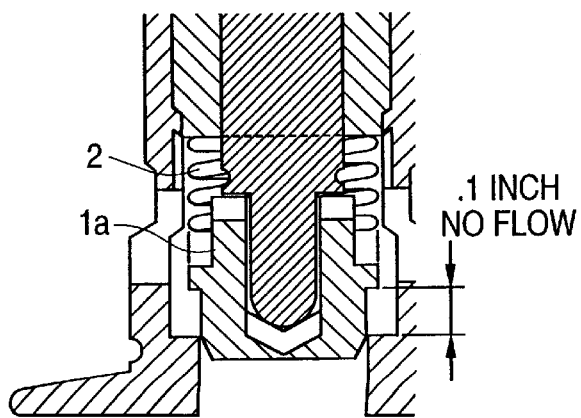
FIG. 11B is a view of a rebound damping valve like that in FIG. 11A but with a valve configuration which requires a linear travel of 0.1 inch before allowing any flow.

A further manipulation can be achieved by altering the rate of change of flow area versus the linear travel of the rebound valve 1. For example, the rebound valve 1 in the embodiment of FIGS. 9, 10A, 10B and 11A allows flow to occur immediately upon any linear displacement, whereas a rebound valve la, as depicted in FIG. 11B, requires a linear travel of 0.1 inch before allowing any flow. This feature is further used to characterize the effects of the volume displacement of the rebound valve.

FIG. 14 schematically illustrates a hydraulic suspension unit between a vehicle wheel 63 and the body 64 of the vehicle, such as a bicycle or motorcycle, the wheel traveling along a surface having a two inch drop. Assume a 1:1 motion ratio between wheel and shock and that the suspension unit is compressed two inches statically before encountering the two inch vertical drop with the vehicle traveling at a velocity of 30 miles per hour, e.g. 528 in/sec. As a first example, where the suspension unit is one having a conventional rebound damping characteristic, enough to prevent most dangerous recoils, assume that the maximum allowable wheel rebound velocity is limited to 5 inches per second to insure that no "launching" of the vehicle can occur. In a conventional shock this rebound damping would slow the wheel's descent into the two inch depression. Assuming that the wheel could accelerate instantly to 5 in/sec, it would take 2 in/(5 in/sec)=0.4 second for the wheel to reach the ground. Since the vehicle is traveling at a speed of 528 in/sec, the vehicle would traverse (528 in/sec)×(0.4 sec)=211.2 inches, before the wheel would reach the ground. In reality, due to the fact that the wheel cannot accelerate instantly, as assumed for this calculation, this distance would be much greater.

In contrast, where the hydraulic suspension unit is one according to the present invention, while limiting shaft velocity to 5 in/sec if due to spring force, in this case the wheel and tire are allowed to "free fall" into the depression. Using standard physics equations to solve for time and maximum velocity of the free fall of objects in space:

v=gt where v=velocity h=½ gt² h=height g=gravity =32 ft/s²=384 in/s² t=time and rearranging the second equation to solve for time t, $$t = \sqrt{[2h/g]}$$
$$t = \sqrt{[(2) \times (2 \text{ in})/(384 \text{ in}/s^2)]} = .102 \text{ sec}$$

for the wheel to reach the ground. Using the same vehicle velocity as in the first example, the vehicle would travel (528 in/sec)×(0.102 sec)=53.8 inches before the wheel touched the ground, compared to 211.2 inches for the damped wheel. The maximum wheel velocity can be calculated using the equation v=gt=(384 in/sec²)×(0.102 sec)=39.2 in/sec, compared to the maximum velocity of 5 in/sec in the previous case. In this regard, it is noted that if the normal rebound damping in the first example were to be reduced to allow the free fall velocities of this example with the present invention, the result would be uncomfortable and potentially dangerous ride motions under conditions where high rebound damping is necessary to control the return of stored energy from the springing system.

The relationship between spring force and rebound damping is further manipulated according to an additional feature of the invention by employing an auxiliary spring acting to extend the shock without forcing hydraulic liquid through the rebound valve 1. The auxiliary spring can be configured concentrically external to the shock shaft as shown in the embodiment of FIG. 12A, or internal to the shock absorber as shown in the embodiments of FIGS. 12B and 13. The auxiliary spring can be a coil spring, gas, elastomer, or other medium. The auxiliary spring provides a spring assist to the "free fall" characteristics of the suspension unit as discussed above. For example, if an auxiliary spring 29 in the embodiment of FIG. 12A were configured to have 30% of the total spring rate required by the vehicle, then a force equivalent to spring rate times deflection=200 lb/in×2 in=400 lbs is pushing the suspension downward, without resistance from rebound damping. In the example of the two inch drop discussed with reference to FIG. 14, this would result in the following. As in the previous math example:

v=velocity h=height g=gravity=32 ft/sec² =384 in/sec² t=time,

Also w=10 lb (weight of wheel/tire)

a=acceleration k=200 lb/in (aux spring rate)

x=2 in (spring deflection).

From the concept of the conservation of energy, the equation set forth below can be written to relate the potential energy of the wheel due to the auxiliary spring pressure, to the kinetic energy the wheel will have after being put into motion by the auxiliary spring. This equation can be solved to find the velocity v which the auxiliary spring will impart to the wheel/tire and, in turn, the time it takes for the tire to reach the ground. In this case, the effects of gravity producing the free fall velocity found in the previous example are ignored. KE=Kinetic Energy=wv²/2g=Potential Energy= PE=½ kx² thus, wv²/2g=½ kx².

Solving this equation for v:

v=[kx²g/w]

v=[(200 lb/in) (2 in)²(384 in/s²)/(10 lb)]

v=175.3 in/sec.

If the average velocity is then v/2=87.65 in/sec, the time t can be found by dividing distance traveled by average velocity=2 in/87.65 in/sec=0.023 seconds for the tire to reach the ground. This compares to the 0.4 sec of the first example for the conventional shock absorber and the 0.102 sec of the "free fall" example of the present invention.

Thus, if the vehicle has a forward speed of 528 in/sec, it would travel (528 in/sec) (0.023 sec)=12.12 inches after crossing the two inch drop off, before the tire reaches the ground. This is compared to the 211.2 inches of the first example and the 53.8 inches in the free fall example. By allowing the tire to re-establish contact with the ground quicker, control and handling are increased, and ride comfort enhanced.

It is noted that in the instance of the vehicle wanting to rebound quickly due to a high amount of stored spring energy, the rebound velocity would be controlled as previously described, and limited to a desirable velocity. This is the case because the percentage and rise of the spring rate from the auxiliary spring is selected to be a minor percentage of the total spring rate provided by the primary spring means and the auxiliary spring. In the disclosed example the auxiliary spring only provides thirty percent of the total spring rate. Obviously, the percentage and rise of the spring rate used for the auxiliary spring must be carefully chosen against the ratio of sprung to unsprung weight as well as intended function of the vehicle. Too high of a percentage of the total spring rate in the auxiliary spring could cause dangerous undamped extension movements of the shock absorber. For example, if the auxiliary spring was able to provide 100% of the spring force, this spring could return its stored energy with no resistance from the rebound damping, due to the fact that this spring is not required to push hydraulic liquid through the rebound valving, as is the case with the primary spring means.

In the disclosed configurations, when the shock is compressed, both the primary and auxiliary springing systems must be compressed in equal amounts (or equal percentage depending on the hydraulic ratio driving the primary spring). This is always the case regardless of conditions. Thus, when the suspension unit is compressed fully, the primary spring means will always be forced to push the total amount of hydraulic liquid back through the rebound valve, insuring that adequate rebound damping is always available. Due to the fact that the auxiliary spring only provides a minor percentage of the total spring rate, it is unable to apply enough force to the chassis, even when fully deflected, to cause a dangerous recoil action to occur. The primary facts effecting the percentage of auxiliary spring used are: vehicle configuration, number of wheels, sprung weight, unsprung weight, on or off road use, competition use, passenger use.

The characteristics of the auxiliary spring and its dynamic relationship with the primary spring means and the rebound valving are somewhat different depending upon whether the auxiliary spring is positioned as an external spring 29 as shown in FIG. 12A, or internal to the shock as shown at $29^1$ and $29^{11}$ in FIGS. 12B and 13, respectively.

More particularly, the variations shown in FIGS. 12A and 12B are identical in terms of function and operation, because even though the spring $29^1$ is internal in FIG. 12B it occupies the same volume regardless of its state of compression. The variation shown in FIG. 13 however, is separated from the hydraulic liquid of the shock with a divider piston 30. This means that the internal volume of the shock absorber changes at a different rate than in the embodiments of FIGS. 12A and 12B, having implications on spring rate as well as compression and rebound damping.

From the disclosed embodiments of the present invention, it can be seen that one of the advantages realized with the present invention is that 100% of the shock liquid displaced by extension or compression is forced through a single path (through the rebound valve or compression valve), allowing more accurate and consistent damping control. Primary spring force is then arranged as shown in the disclosed embodiments to act directly on the reservoir piston or bladder, causing the fluid pressure to act on the cross-sectional area of the shock shaft, forcing the shock to extend or resist compression. With the spring force and rebound valving arranged in this manner, they have a direct relationship with each other that allows unique manipulation capabilities of their interaction.

By properly selecting the shaft/reservoir diameter ratio, the spring, whether air, steel or elastomer, can have a mechanical advantage (or disadvantage) when acting on the shock shaft through the reservoir piston/bladder, allowing flexible packaging. Note that in all embodiments of compression and rebound valving described, in each case, the compression and rebound valves themselves act as check valves against flow in the opposite direction making use of separate check valves unnecessary.

The following are examples of various conditions under which the operation of the hydraulic suspension unit of the present invention is compared to more conventional solutions. The first example would be a vehicle encountering a pothole or depression. It is shown in the above discussion with respect to FIG. 14, the present invention allows the wheel to make contact with the ground much sooner, increasing control and the tires' mechanical grip with the surface.

A second comparative example is where a wheel of a vehicle encounters a sudden bump or elevation gain in the surface. With a conventional damper with compromise rebound damping, after the shock compresses due to the terrain rising under it, a large recoil is impending as the spring tries to release the energy stored. Since the rebound damping is based on a compromise, in this instance there is not enough rebound damping to prevent excessively high rebound velocities, resulting in uncontrollable ride motions as the chassis is thrust upward, as well as loss of control, with the possibility that the vehicle may be launched upward with sufficient force to cause the vehicle to leave the ground. In contrast, with the present invention none of the foregoing is possible, due to the fact that the damping has been specifically chosen to limit the maximum rebound velocity for conditions where the springing system is returning stored energy. Thus, the resultant ride motions are well controlled, and the recoil sufficiently damped to avoid the aforementioned problems.

A third example is an extension of the second. Once a bump or terrain change exceeds a certain magnitude, it becomes a jump. Not normally encountered on public highways, it is nevertheless a very common component of many off-road car, truck, motorcycle, and bicycle races. For this purpose, a jump is defined as a rapid rise in elevation, such as a ramp, that causes a vehicle traversing it to leave the ground completely with all wheels off the ground. Typically, the problems here are the same as in the previous example, however, they are magnified in the case of a jump.

When the vehicle is on the face of the jump, it is typical for the suspension to compress completely to its limits, to cope with the changing direction of the vehicle, and the resultant upward accelerations. This causes the spring system to store the maximum amount of energy possible, which it will return as soon as the change of direction is complete, and the resultant acceleration is diminished. With conventional rebound damping, this return of energy takes place too quickly, adding an undesirable component of vertical velocity to the vehicle's path, already having a vertical component due to the ramp.

This is particularly dangerous in the rear. After the front of the vehicle has left the face of the jump, the front suspension can no longer push the vehicle upward as there is no longer a surface to push against. However, the rear of the vehicle and the rear suspension is still on the ramp. Any additional upward motion in the rear at this point has the tendency, not only to raise the rear, but to impart a rotational torque on the vehicle inducing the front to nose dive potentially causing the vehicle to flip end over end. Such a phenomena is not uncommon in the previously mentioned racing. Again, with conventional shocks, the rebound damping is usually too compromised to allow the correct amount of rebound control for these conditions. Even if a compromise is reached that allows acceptable performance under certain circumstances (or given track conditions), if conditions change, such as a lip being formed at the peak of a jump during the course of the race, the delicate balance of the compromise is upset, once again causing undesirable behavior.

The present invention solves these problems in that the hydraulic suspension unit allows the rebound damping to be chosen specifically to limit the maximum rebound velocity induced by the springing system, regardless of the events that lead to the springing system having stored energy. Therefore the vehicle will be very stable when leaving the jump, and travel in a lower trajectory, again allowing the wheels to return to the surface earlier, ready for braking, turning or accelerating. After the vehicle leaves the face of the jump, the wheels are allowed to free fall to the extension limit of the suspension, with no resistance from the shock absorber. This allows the maximum pressure differential across the rebound valve, helping the valve to open sooner, further helping the wheel descend. This also serves to cause the vehicle to land sooner, as the wheels impart a downward impulse as they reach the limits of extension.

A further example of the improved performance of the hydraulic suspension unit of the present invention as compared with the conventional suspension unit is that of a four-wheeled vehicle in a corner. As the vehicle enters the corner, the side of the vehicle on the outside of the corner moves downward as the suspension compresses, and upward on the inside as the suspension extends. This action is caused by weight transfer, which allows the inside springs to return some or all of the energy stored due to supporting the vehicle's static weight. This chassis roll during cornering is resisted by the springs and compression damping on the outside, and the rebound damping on the inside. In this instance, as long as there is still rebound stroke available, the inside wheel never becomes completely unloaded. Since this is also a case of energy being returned by the springing system, the rebound damping is able to retain full control of wheel extension, providing the sharpest handling response to control inputs. In the event that the inner wheel encounters a depression while in a corner, with the suspension unit of the present invention it would still free fall into this depression with no resistance, as soon as the wheel was unloaded.

Thus, it can be seen that the improved hydraulic suspension unit of the present invention allows the use of rebound damping in sufficient strength to control any energy being returned from the spring, allowing shock rebound velocity to be well controlled. Simultaneously, any unloading of a wheel allows the wheel to free-fall until such wheel is again in a loaded condition. This combination of attributes greatly increases ride comfort and handling control. The use of the auxiliary spring as described, further assists the tire in maintaining contact with the surface. The compression damping valve arrangement allows precise control over small and large impacts, without imparting ride harshness. The overall effect is one of increased ride comfort, with better control of all chassis and wheel movements, resulting in more consistent contact pressure between the tire and road surface. The features of the present invention permitting external adjustment of the spring and rebound damping characteristics as well as the compression damping characteristic make the hydraulic suspension unit of the present invention well suited for use in light vehicles such as motorcycles and bicycles, where the rider weight is a very large percentage of the total sprung weight (over 90% in the case of a bicycle). With such a vehicle, it is impossible to choose one spring weight that is suitable for all rider weights. Different rider skill levels also play a large role in this choice.

While several embodiments of the present invention have been shown and described herein, it will be obvious to one skilled in the art that the present invention may be put into practice in many forms and that many modifications may be made thereto without departing from the spirit of the invention. Therefore, this invention is not limited to the foregoing embodiments, but rather by the invention as defined by the following claims both literally and through the scope available under the Doctrine of Equivalents.

I claim:

1. A hydraulic suspension unit comprising:

first and second members arranged in telescoping relation with one another for relative movement along a longitudinal axis of said suspension unit with changes in force on said suspension unit compressing and extending said suspension unit within an extension limit of the suspension unit;

means containing a hydraulic liquid, said containing means including a first chamber containing hydraulic liquid in compressive force transmitting relation between said first and second members without resisting extension of said suspension unit to said extension limit by external forces on said suspension unit, the volume of said first chamber being decreased and increased with relative movement of said first and second members toward and away from one another along said longitudinal axis, respectively, and said containing means further including a reservoir containing hydraulic liquid and passage means connecting said first chamber and said reservoir to permit the flow of hydraulic liquid between said first chamber and said reservoir, said reservoir including a movable wall which can be moved back and forth to increase and decrease the volume of said reservoir as a function of the volume of the hydraulic liquid flowing to and from said reservoir, respectively;

spring means for resiliently biasing said movable wall against the hydraulic liquid in said reservoir with a force which is a function of the amount of movement of said spring means and in turn the position of said movable wall and volume of said reservoir, said spring means storing energy upon movement of said movable wall increasing the volume of said reservoir with the flow of hydraulic liquid to said reservoir, and said spring means releasing said stored energy upon movement of said movable wall decreasing the volume of said reservoir with the flow of hydraulic liquid from said reservoir to said first chamber;

compression damping means for damping the flow of hydraulic liquid from said first chamber to said reservoir when said suspension unit is compressed to cause relative movement of said first and second members towards one another along said longitudinal axis decreasing the volume of said first chamber;

rebound damping means for only affecting the rebound velocity of the initially compressed suspension unit when such velocity is due to the force imparted by the spring means when it is returning stored energy after some initial compression, said rebound damping means damping the flow of hydraulic liquid to said first chamber resulting from said spring means releasing energy stored therein by moving said movable wall to decrease the volume of said reservoir and flow hydraulic fluid from said reservoir to said first chamber for extending said suspension unit, while said rebound damping means and said suspension unit at the same time not resisting relative movement of said first and second members away from one another for extending said suspension unit to said extension limit of said suspension unit by external forces on said suspension unit; and externally accessible means for independently adjusting an amount of damping provided by each of said compression damping means and said rebound damping means.

2. The hydraulic suspension unit according to claim 1, wherein said passage means directs all of the flow of hydraulic liquid from said first chamber during compression of the suspension unit to said reservoir via said compression damping means and directs all of the flow of hydraulic liquid from the reservoir to the first chamber via said rebound damping means.

3. The hydraulic suspension unit according to claim 1, wherein said spring means includes a pressurized gas arranged in an enclosed space in said suspension unit for acting on said movable wall of said reservoir.

4. The hydraulic suspension unit according to claim 3, further comprising externally accessible means for adjusting a volume of said enclosed space containing said pressurized gas for adjusting a spring characteristic of said spring means.

5. The hydraulic suspension unit according to claim 3, wherein said spring means comprises a coil spring acting on said movable wall, said coil spring being arranged in said enclosed space containing said pressurized gas, and externally assessable means for adjustably preloading said coil spring.

6. The hydraulic suspension unit according to claim 1, wherein said rebound damping means includes a rebound damping valve which is movable in response to pressure of said hydraulic liquid thereon for opening and closing said passage means for controlling the flow of hydraulic liquid through said passage means from said reservoir to said first chamber during release of stored energy from said spring means, and further comprising means for adjustably limiting the maximum flow area for hydraulic liquid flowing from said reservoir to said first chamber when said rebound damping valve is opened for controlling a maximum speed of expansion of said suspension unit due to release of stored energy from said spring means.

7. The hydraulic suspension unit according to claim 6, wherein said means for adjustably limiting the maximum flow area includes a mechanical stop limiting the opening of said rebound damping valve, and wherein said externally accessible means adjusts the position of said stop.

8. The hydraulic suspension unit according to claim 1, wherein said rebound damping means includes a rebound damping valve which is movable in response to pressure of said hydraulic liquid thereon for opening and closing said passage means for controlling the flow of hydraulic liquid through said passage means from said reservoir to said first chamber during release of stored energy from said spring means, and further comprising means for adjustably, resiliently biasing the rebound damping valve in a position closing said passage means for controlling the hydraulic liquid pressure necessary for moving said rebound damping valve to open said passage means permitting the flow of hydraulic liquid from said reservoir to said first chamber and the release of stored energy of said spring means.

9. A hydraulic suspension unit comprising:

first and second members arranged in telescoping relation with one another for relative movement along a longitudinal axis of said suspension unit with changes in force on said suspension unit compressing and extending said suspension unit within an extension limit of the suspension unit;

means containing a hydraulic liquid, said containing means including a first chamber containing hydraulic liquid in compressive force transmitting relation between said first and second members without resisting extension of said suspension unit to said extension limit by external forces on said suspension unit, the volume of said first chamber being decreased and increased with relative movement of said first and second members toward and away from one another along said longitudinal axis, respectively and said containing means further including a reservoir containing hydraulic liquid and passage means connecting said first chamber and said reservoir to permit the flow of hydraulic liquid between said first chamber and said reservoir, said reservoir including a movable wall which can be moved back and forth to increase and decrease the volume of said reservoir as a function of the volume of the hydraulic liquid flowing to and from said reservoir, respectively;

spring means for resiliently biasing said movable wall against the hydraulic liquid in said reservoir with a force which is a function of the amount of movement of said spring means and in turn the position of said movable wall and volume of said reservoir, said spring means storing energy upon movement of said movable wall increasing the volume of said reservoir with the flow of hydraulic liquid to said reservoir, and said spring means releasing said stored energy upon movement of said movable wall decreasing the volume of said reservoir with the flow of hydraulic liquid from said reservoir to said first chamber;

compression damping means for damping the flow of hydraulic liquid from said first chamber to said reservoir when said suspension unit is compressed to cause relative movement of said first and second members towards one another alone said longitudinal axis decreasing the volume of said first chamber; and rebound damping means for only affecting the rebound velocity of the initially compressed suspension unit when such velocity is due to the force imparted by the spring means when it is returning stored energy after some initial compression, said rebound damping means damping the flow of hydraulic liquid to said first chamber resulting from said spring means releasing energy stored therein by moving said movable wall to decrease the volume of said reservoir and flow hydraulic fluid from said reservoir to said first chamber for extending said suspension unit, while said rebound damping means and said suspension unit at the same time not resisting relative movement of said first and second members away from one another for extending said suspension unit to said extension limit of said suspension unit by external forces on said suspension unit;

wherein said rebound damping means includes a rebound damping valve which is movable in response to pressure of said hydraulic liquid thereon for opening and closing said passage means for controlling the flow of hydraulic liquid through said passage means from said reservoir to said first chamber during release of stored energy from said spring means, and further comprising means for adjustably, resiliently biasing the rebound damping valve in a position closing said passage means for controlling the hydraulic liquid pressure necessary for moving said rebound damping valve to open said passage means permitting the flow of hydraulic liquid from said reservoir to said first chamber and the release of stored energy of said spring means, wherein said rebound damping valve is in the form of a poppet valve, and wherein said means for adjustably, resiliently biasing includes a coil spring and externally accessible means for adjusting a preload on said coil spring resiliently biasing the poppet valve in a position closing said passage means.

10. The hydraulic suspension unit according to claim 1, wherein said rebound damping means includes a rebound damping valve which is movable in response to pressure of said hydraulic liquid thereon for opening and closing said passage means for controlling the flow of hydraulic fluid through said passage means from said reservoir to said first chamber during release of stored energy from said spring means, and wherein the surface areas of the upstream and downstream sides of said rebound damping valve are relatively small and relatively large, respectively, for enhancing the opening characteristic of said valve and the return flow of fluid from said reservoir to said first chamber when said suspension unit is extended by external forces.

11. The hydraulic suspension unit according to claim 10, wherein said ratio of surface areas is at least 1.5:1.

12. The hydraulic suspension unit according to claim 1, wherein said compression damping means includes a compression damping valve which is movable in response to pressure of said hydraulic liquid thereon for opening and closing said passage means for controlling the flow of hydraulic liquid through said passage means from said first chamber to said reservoir during compression of said suspension unit, and further comprising means for adjustably biasing the compression damping valve in a position closing said passage means for controlling the hydraulic liquid pressure and hence compressive force on the suspension unit necessary for moving said compression damping valve to open said passage means permitting the flow of hydraulic liquid from said first chamber to said reservoir and the compression of said suspension unit.

13. The hydraulic suspension unit according to claim 12, wherein said compression damping valve is in the form of a flexible disk, and wherein said means for adjustably biasing applies an adjustable preload on said disk to effect the hydraulic pressure necessary to deflect said disk and open said passage means.

14. The hydraulic suspension unit according to claim 1, wherein said compression damping means includes a compression damping valve which is movable in response to pressure of said hydraulic liquid thereon for opening and closing said passage means for controlling the flow of hydraulic liquid through said passage means through said first chamber to said reservoir during compression of said suspension unit, and further comprising means for adjustably limiting the maximum flow area for hydraulic liquid flowing from said first chamber to said reservoir when said compression damping valve is open for controlling a maximum speed of compression of said suspension unit.

15. The hydraulic suspension unit according to claim 14, wherein said means for adjustably limiting the maximum flow area includes a mechanical stop limiting the opening extent of said compression damping valve, and means for adjusting the position of said stop.

16. The hydraulic suspension unit according to claim 14, wherein said means for adjustably limiting the maximum flow area includes an additional valve located in said passage means upstream of said compression damping valve with respect to the flow of hydraulic liquid from said first chamber to said reservoir, and means for adjusting the extent which said additional valve restricts the flow of hydraulic liquid in said passage means during compression of said suspension unit.

17. The hydraulic suspension unit according to claim 16, wherein said additional valve is a needle valve.

18. A hydraulic suspension unit comprising:

first and second members arranged in telescoping relation with one another for relative movement along a longitudinal axis of said suspension unit with changes in force on said suspension unit compressing and extending said suspension unit;

means containing a hydraulic liquid, said containing means including a first chamber containing hydraulic liquid in force transmitting relation between said first and second members, the volume of said first chamber being decreased and increased with relative movement of said first and second members toward and away from one another along said longitudinal axis, respectively, and said containing means further including a reservoir containing hydraulic liquid and passage means connecting said first chamber and said reservoir to permit the flow of hydraulic liquid between said first chamber and said reservoir, said reservoir including a movable wall which can be moved back and forth to increase and decrease the volume of said reservoir as a function of the volume of the hydraulic liquid flowing to and from said reservoir, respectively;

spring means for resiliently biasing said movable wall against the hydraulic liquid in said reservoir with a force which is a function of the amount of movement of said spring means and in turn the position of said movable wall and volume of said reservoir, said spring means storing energy upon movement of said movable wall increasing the volume of said reservoir with the flow of hydraulic liquid to said reservoir, and said spring means releasing said stored energy upon movement of said movable wall decreasing the volume of said reservoir with the flow of hydraulic liquid from said reservoir to said first chamber;

compression damping means for damping the flow of hydraulic liquid from said first chamber to said reservoir when said suspension unit is compressed to cause relative movement of said first and second members towards one another along said longitudinal axis decreasing the volume of said first chamber;

rebound damping means for damping the flow of hydraulic liquid to said first chamber resulting from said spring means releasing energy stored therein by moving said movable wall to decrease the volume of said reservoir and flow hydraulic fluid from said reservoir to said first chamber for extending said suspension unit;

wherein said movable wall is in the form of a flexible diaphragm mounted for movement within said suspension unit, said reservoir being located on one side of said flexible diaphragm and said spring means being provided on an opposite side of said flexible diaphragm for resiliently biasing said flexible diaphragm against hydraulic liquid in said reservoir, and wherein said flexible diaphragm is arranged to be in a torus shape when at the extremes of its travel, a disc of a stiff material being provided at the center of said flexible diaphragm for locally stiffening said center of said diaphragm.

19. The hydraulic suspension unit according to claim 1, further comprising auxiliary spring means acting to cause relative movement along said longitudinal axis along said first and second members to extend said suspension unit without resistance from said rebound damping means.

20. A hydraulic suspension unit comprising:

first and second members arranged in telescoping relation with one another for relative movement along a longitudinal axis of said suspension unit with changes in force on said suspension unit compressing and extending said suspension unit within an extension limit of the suspension unit;

means containing a hydraulic liquid, said containing means including a first chamber containing hydraulic liquid in compressive force transmitting relation between said first and second members without resisting extension of said suspension unit to said extension limit by external forces on said suspension unit, the volume of said first chamber being decreased and increased with relative movement of said first and second members toward and away from one another along said longitudinal axis, respectively and said containing means further including a reservoir containing hydraulic liquid and passage means connecting said first chamber and said reservoir to permit the flow of hydraulic liquid between said first chamber and said reservoir, said reservoir including a movable wall which can be moved back and forth to increase and decrease the volume of said reservoir as a function of the volume of the hydraulic liquid flowing to and from said reservoir, respectively;

spring means for resiliently biasing said movable wall against the hydraulic liquid in said reservoir with a force which is a function of the amount of movement of said spring means and in turn the position of said movable wall and volume of said reservoir, said spring means storing energy upon movement of said movable wall increasing the volume of said reservoir with the flow of hydraulic liquid to said reservoir, and said spring means releasing said stored energy upon movement of said movable wall decreasing the volume of said reservoir with the flow of hydraulic liquid from said reservoir to said first chamber;

compression damping means for damping the flow of hydraulic liquid from said first chamber to said reservoir when said suspension unit is compressed to cause relative movement of said first and second members towards one another along said longitudinal axis decreasing the volume of said first chamber; and rebound damping means for only affecting the rebound velocity of the initially compressed suspension unit when such velocity is due to the force imparted by the spring means when it is returning stored energy after some initial compression, said rebound damping means damping the flow of hydraulic liquid to said first chamber resulting from said spring means releasing energy stored therein by moving said movable wall to decrease the volume of said reservoir and flow hydraulic fluid from said reservoir to said first chamber for extending said suspension unit, while said rebound damping means and said suspension unit at the same time not resisting relative movement of said first and second members away from one another for extending said suspension unit to said extension limit of said suspension unit by external forces on said suspension unit, and further comprising auxiliary spring means acting to cause relative movement along said longitudinal axis along said first and second members to extend said suspension unit without resistance from said rebound damping means, and wherein said auxiliary spring means is external to said telescoping first and second members.

21. The hydraulic suspension unit according to claim 19, wherein said auxiliary spring means is arranged inside of one of said first and second members.

22. The hydraulic suspension unit according to claim 21, wherein said auxiliary spring means is located in said first chamber.

23. The hydraulic suspension unit according to claim 21, wherein said first chamber includes a movable wall defining a portion of said first chamber, said auxiliary spring means yieldably biasing said movable wall of said first chamber in a direction tending to reduce the volume of said first chamber.

24. A hydraulic suspension unit comprising:

first and second members arranged in telescoping relation with one another for relative movement along a longitudinal axis of said suspension unit with changes in force on said suspension unit compressing and extending said suspension unit within an extension limit of the suspension unit;

means containing a hydraulic liquid, said containing means including a first chamber containing hydraulic liquid in compressive force transmitting relation between said first and second members without resisting extension of said suspension unit to said extension limit by external forces on said suspension unit, the volume of said first chamber being decreased and increased with relative movement of said first and second members toward and away from one another along said longitudinal axis, respectively, and said containing means further including a reservoir containing hydraulic liquid and passage means connecting said first chamber and said reservoir to permit the flow of hydraulic liquid between said first chamber and said reservoir, said reservoir including a movable wall which can be moved back and forth to increase and decrease the volume of said reservoir as a function of the volume of the hydraulic liquid flowing to and from said reservoir, respectively;

spring means for resiliently biasing said movable wall against the hydraulic liquid in said reservoir with a force which is a function of the amount of movement of said spring means and in turn the position of said movable wall and volume of said reservoir, said spring means storing energy upon movement of said movable wall increasing the volume of said reservoir with the flow of hydraulic liquid to said reservoir, and said spring means releasing said stored energy upon movement of said movable wall decreasing the volume of said reservoir with the flow of hydraulic liquid from said reservoir to said first chamber;

compression damping means for damping the flow of hydraulic liquid from said first chamber to said reservoir when said suspension unit is compressed to cause relative movement of said first and second members towards one another along said longitudinal axis decreasing the volume of said first chamber; and rebound damping means for only affecting the rebound velocity of the initially compressed suspension unit when such velocity is due to the force imparted by the spring means when it is returning stored energy after some initial compression, said rebound damping means damping the flow of hydraulic liquid to said first chamber resulting from said spring means releasing energy stored therein by moving said movable wall to decrease the volume of said reservoir and flow hydraulic fluid from said reservoir to said first chamber for extending said suspension unit, while said rebound damping means and said suspension unit at the same time not resisting relative movement of said first and second members away from one another for extending said suspension unit to said extension limit of said suspension unit by external forces on said suspension unit, wherein said containing means further comprises an additional reservoir containing hydraulic liquid and additional passage means connecting said first chamber and said additional reservoir to permit the flow of hydraulic liquid between said first chamber and said additional reservoir, said additional reservoir including an additional movable wall which can be moved back and forth to increase and decrease the volume of said additional reservoir as a function of the volume of the hydraulic liquid flowing to and from said additional reservoir, respectively, and additional spring means for resiliently biasing said additional movable wall against the hydraulic liquid in said additional reservoir with a force which is a function of the amount of movement of said additional spring means and in turn the position of said additional movable wall and volume of said additional reservoir.

25. The hydraulic suspension unit according to claim 24, wherein one of said movable wall and said additional movable wall is a resilient bladder and the other is a piston, said spring means resiliently biasing said resilient bladder including a pressurized gas and said spring means resiliently biasing said piston including a coil spring, said suspension unit further comprising externally accessible means for adjusting the volume of an enclosed space containing said pressurized gas, and externally accessible means for adjusting a preload of said coil spring.

26. The hydraulic suspension unit according to claim 1, wherein said movable wall is in the form of a piston mounted for movement within a cylinder in said suspension unit, said reservoir being located on one side of said piston and said spring means being provided on an opposite side of said piston for resiliently biasing said piston against hydraulic liquid in said reservoir.

27. The hydraulic suspension unit according to claim 1, wherein said movable wall is in the form of an elastic bladder mounted for movement within said suspension unit, said reservoir being located on one side of said elastic bladder and said spring means being provided on an opposite side of said elastic bladder for resiliently biasing said bladder against hydraulic liquid in said reservoir.

28. The hydraulic suspension unit according to claim 1, wherein said movable wall is in the form of a flexible diaphragm mounted for movement within said suspension unit, said reservoir being located on one side of said flexible diaphragm and said spring means being provided on an opposite side of said flexible diaphragm for resiliently biasing said flexible diaphragm against hydraulic liquid in said reservoir.

29. The hydraulic suspension unit according to claim 1, wherein said rebound damping valve is arranged for movement so as to displace hydraulic liquid on the first chamber side of the rebound damping valve during opening of said valve, the volume of said rebound damping valve and its linear travel during opening being selected to provide displacement of a predetermined volume of hydraulic liquid and hence a predetermined expansion of said suspension unit during opening of said valve.

30. A hydraulic suspension unit comprising:

first and second members arranged in telescoping relation with one another for relative movement along a longitudinal axis of said suspension unit with changes in force on said suspension unit compressing and extending said suspension unit within an extension limit of the suspension unit;

means containing a hydraulic liquid, said containing means including a first chamber containing hydraulic liquid in compressive force transmitting relation between said first and second members without resisting extension of said suspension unit to said extension limit by external forces on said suspension unit, the volume of said first chamber being decreased and increased with relative movement of said first and second members toward and away from one another along said longitudinal axis, respectively, and said containing means further including a reservoir containing hydraulic liquid and passage means connecting said first chamber and said reservoir to permit the flow of hydraulic liquid between said first chamber and said reservoir, said reservoir including a movable wall which can be moved back and forth to increase and decrease the volume of said reservoir as a function of the volume of the hydraulic liquid flowing to and from said reservoir, respectively;

spring means for resiliently biasing said movable wall against the hydraulic liquid in said reservoir with a force which is a function of the amount of movement of said spring means and in turn the position of said movable wall and volume of said reservoir, said sprint means storing energy upon movement of said movable wall increasing the volume of said reservoir with the flow of hydraulic liquid to said reservoir, and said spring means releasing said stored energy upon movement of said movable wall decreasing the volume of said reservoir with the flow of hydraulic liquid from said reservoir to said first chamber;

compression damping means for damping the flow of hydraulic liquid from said first chamber to said reservoir when said suspension unit is compressed to cause relative movement of said first and second members towards one another along said longitudinal axis decreasing the volume of said first chamber; and rebound damping means for only affecting the rebound velocity of the initially compressed suspension unit when such velocity is due to the force imparted by the spring means when it is returning stored energy after some initial compression, said rebound damping means damping the flow of hydraulic liquid to said first chamber resulting from said spring means releasing energy stored therein by moving said movable wall to decrease the volume of said reservoir and flow hydraulic fluid from said reservoir to said first chamber for extending said suspension unit, while said rebound damping means and said suspension unit at the same time not resisting relative movement of said first and second members away from one another for extending said suspension unit to said extension limit of said suspension unit by external forces on said suspension unit, wherein said rebound damping means includes a rebound damping valve which is movable in response to pressure of said hydraulic liquid thereon for opening and closing said passage means for controlling the flow of hydraulic liquid through said passage means from said reservoir to said first chamber during release of stored energy from said spring means, and wherein said rebound damping valve is arranged for movement so as to displace hydraulic liquid on the first chamber side of the rebound damping valve during opening of said valve, the volume of said rebound damping valve and its linear travel during opening, being selected to provide displacement of a predetermined volume of hydraulic liquid and hence a predetermined expansion of said suspension unit during opening of said valve; and wherein said rebound damping valve is configured to require a predetermined linear travel before allowing any flow of hydraulic liquid past said rebound damping valve.

31. The hydraulic suspension unit according to claim 1, wherein each of said compression damping means and said rebound damping means acts as a check valve against flow of hydraulic liquid in the opposite direction from that which is damped thereby.

32. In a lightweight, wheeled vehicle where rider weight is a relatively large percentage of total sprung weight of said vehicle, said vehicle including a vehicle body, a vehicle wheel and a hydraulic suspension unit for supporting weight of said vehicle in relation to said wheel, the improvement comprising said hydraulic suspension unit comprising:

first and second members arranged in telescoping relation with one another for relative movement along a longitudinal axis of said suspension unit with changes in force on said suspension unit compressing and extending said suspension unit within an extension limit of the suspension unit;

means containing a hydraulic liquid, said containing means including a first chamber containing hydraulic liquid in compressive force transmitting relation between said first and second members without resisting extension of said suspension unit to said extension limit by external forces on said suspension unit, the volume of said first chamber being decreased and increased with relative movement of said first and second members toward and away from one another along said longitudinal axis, respectively, and said containing means further including a reservoir containing hydraulic liquid and passage means connecting said first chamber and said reservoir to permit the flow of hydraulic liquid between said first chamber and said reservoir, said reservoir including a movable wall which can be moved back and forth to increase and decrease the volume of said reservoir as a function of the volume of the hydraulic liquid flowing to and from said reservoir, respectively;

spring means for resiliently biasing said movable wall against the hydraulic liquid in said reservoir with a force which is a function of the amount of movement of said spring means and in turn the position of said movable wall and volume of said reservoir, said spring means storing energy upon movement of said movable wall increasing the volume of said reservoir with the flow of hydraulic liquid to said reservoir, and said spring means releasing said stored energy upon movement of said movable wall decreasing the volume of said reservoir with the flow of hydraulic liquid from said reservoir to said first chamber;

compression damping means for damping the flow of hydraulic liquid from said first chamber to said reservoir when said suspension unit is compressed to cause relative movement of said first and second members towards one another along said longitudinal axis decreasing the volume of said first chamber; and rebound damping means for only affecting the rebound velocity of the initially compressed suspension unit when such velocity is due to the force imparted by the spring means when it is returning stored energy after some initial compression, said rebound damping means damping the flow of hydraulic liquid to said first chamber resulting from said spring means releasing energy stored therein by moving said movable wall to decrease the volume of said reservoir and flow hydraulic fluid from said reservoir to said first chamber for extending said suspension unit, while said rebound damping means and said suspension unit at the same time not resisting relative movement of said first and second members away from one another for extending said suspension unit to said extension limit of the suspension unit by external forces on said suspension unit; and externally accessible means for independently adjusting each of a spring characteristic of said spring means and an amount of rebound damping provided by said rebound damping means.

33. The lightweight vehicle according to claim 32, further comprising externally accessible means for adjusting an amount of compression damping provided by said compression damping means.

34. The lightweight vehicle according to claim 32, wherein said passage means directs all of the flow of hydraulic liquid from said first chamber during compression of the suspension unit to said reservoir via said compression damping means and directs all of the flow of hydraulic liquid from the reservoir to the first chamber via said rebound damping means.

35. A hydraulic suspension unit comprising:

first and second members arranged in telescoping relation with one another for relative movement along a longitudinal axis of said suspension unit with changes in force on said suspension unit compressing and extending said suspension unit within an extension limit of the suspension unit;

means containing a hydraulic liquid, said containing means including a first chamber containing hydraulic liquid in compressive force transmitting relation between said first and second members without resisting extension of said suspension unit to said extension limit by external forces on said suspension unit, the volume of said first chamber being decreased and increased with relative movement of said first and second members toward and away from one another along said longitudinal axis, respectively, and said containing means further including a reservoir containing hydraulic liquid and passage means connecting said first chamber and said reservoir to permit the flow of hydraulic liquid between said first chamber and said reservoir, said reservoir including a movable wall which can be moved back and forth to increase and decrease the volume of said reservoir as a function of the volume of the hydraulic liquid flowing to and from said reservoir, respectively;

spring means for resiliently biasing said movable wall against the hydraulic liquid in said reservoir with a force which is a function of the amount of movement of said spring means and in turn the position of said movable wall and volume of said reservoir, said spring means storing energy upon movement of said movable wall increasing the volume of said reservoir with the flow of hydraulic liquid to said reservoir, and said spring means releasing said stored energy upon movement of said movable wall decreasing the volume of said reservoir with the flow of hydraulic liquid from said reservoir to said first chamber;

compression damping means for damping the flow of hydraulic liquid from said first chamber to paid reservoir when said suspension unit is compressed to cause relative movement of said first and second members towards one another along said longitudinal axis decreasing the volume of said first chamber;

rebound damping means for only affecting the rebound velocity of the initially compressed suspension unit when such velocity is due to the force imparted by the spring means when it is returning stored energy after some initial compression, said rebound damping means damping the flow of hydraulic liquid to said first chamber resulting from said spring means releasing energy stored therein by moving said movable wall to decrease the volume of said reservoir and flow hydraulic fluid from said reservoir to said first chamber for extending said suspension unit, while said rebound damping means and said suspension unit at the same time not resisting relative movement of said first and second members away from one another for extending said suspension unit to said extension limit of the suspension unit by external force on said suspension unit;

wherein said compression damping means includes a compression damping valve which is movable in response to pressure of said hydraulic liquid thereon for opening and closing said passage means for controlling the flow of hydraulic liquid through said passage means from said first chamber to said reservoir during compression of said suspension unit, and further comprising means for adjustably biasing the compression damping valve in a position closing said passage means for controlling the hydraulic liquid pressure and hence compressive force on the suspension unit necessary for moving said compression damping valve to open said passage means permitting the flow of hydraulic liquid from said first chamber to said reservoir and the compression of said suspension unit; and wherein said means for adjustably biasing the compression damping valve also simultaneously adjustably limits the maximum flow area for hydraulic liquid flowing from said first chamber to said reservoir when said compression damping valve is open for controlling a maximum speed of compression of said suspension unit.

36. The hydraulic suspension unit according to claim 35, wherein said passage means directs all of the flow of hydraulic liquid from said first chamber during compression of the suspension unit to said reservoir via said compression damping means and directs all of the flow of hydraulic liquid from the reservoir to the first chamber via said rebound damping means.

37. A hydraulic suspension unit comprising:

first and second members arranged in telescoping relation with one another for relative movement along a longitudinal axis of said suspension unit with changes in force on said suspension unit compressing and extending said suspension unit within an extension limit of the suspension unit;

means containing a hydraulic liquid, said containing means including a first chamber containing hydraulic liquid in compressive force transmitting relation between said first and second member without resisting extension of said suspension unit to said extension limit by external forces on said suspension unit, the volume of said first chamber being decreased and increased with relative movement of said first and second members toward and away from one another along said longitudinal axis, respectively, and said containing means further including a reservoir containing hydraulic liquid and passage means connecting said first chamber and said reservoir to permit the flow of hydraulic liquid between said first chamber and said reservoir, said reservoir including a movable wall which can be moved back and forth to increase and decrease the volume of said reservoir as a function of the volume of the hydraulic liquid flowing to and from said reservoir, respectively;

spring means for resiliently biasing said movable wall against the hydraulic liquid in said reservoir with a force which is a function of the amount of movement of said spring means and in turn the position of said movable wall and volume of said reservoir, said spring means storing energy upon movement of said movable wall increasing the volume of said reservoir with the flow of hydraulic liquid to said reservoir, and said spring means releasing said stored energy upon movement of said movable wall decreasing the volume of said reservoir with the flow of hydraulic liquid from said reservoir to said first chamber;

compression damping means for damping the flow of hydraulic liquid from said first chamber to said reservoir when said suspension unit is compressed to cause relative movement of said first and second members toward one another along said longitudinal axis decreasing the volume of said first chamber, said compression damping means including a compression damping valve which is movable in response to pressure of said hydraulic liquid thereon for opening and closing said passage means for controlling the flow of hydraulic liquid through said passage means from said first chafer to said reservoir during compression of said suspension unit, and means for adjustably biasing the compression damping valve in a position closing said passage means for controlling the hydraulic liquid pressure and hence compressive force on the suspension unit necessary for moving said compression damping valve to open said passage means permitting the flow of hydraulic liquid from said first chamber to said reservoir and the compression of said suspension unit;

rebound damping means for only affecting the rebound velocity of the initially compressed suspension unit when such velocity is due to the force imparted by the spring means when it is returning stored energy after some initial compression, said rebound damping means damping the flow of hydraulic liquid to said first chamber resulting from said spring means releasing energy stored therein by moving said movable wall to decrease the volume of said reservoir and flow hydraulic fluid from said reservoir to said first chamber for extending said suspension unit, while said rebound damping means and said suspension unit at the same time not resisting relative movement of said first and second members away from one another for extending said suspension unit to said extension limit of the suspension unit by external forces on said suspension unit, said rebound damping means including a rebound damping valve which is movable in response to pressure of said hydraulic liquid thereon for opening and closing said passage means for controlling the hydraulic liquid through said passage means from said reservoir to said first chamber during release of stored energy from said spring means, and means for adjustably limiting the maximum flow area for hydraulic liquid flowing from said reservoir to said first chamber when said rebound damping valve is opened for controlling a maximum speed of expansion of said suspension unit due to release of stored energy from said spring means, and means for adjustably, resiliently biasing the rebound damping valve in a position closing said passage means for controlling the hydraulic liquid pressure necessary for moving said rebound damping valve to open said passage means permitting the flow of hydraulic liquid from said reservoir to said first chamber and the release of stored energy of said spring means; and wherein said means for adjustably limiting the maximum flow area for hydraulic liquid flowing from said first chamber to said reservoir when said compression damping valve is open for controlling a maximum speed compression of said suspension unit includes an additional valve located in said passage means upstream of said compression damping valve with respect to the flow of hydraulic liquid from said first chamber to said reservoir, and means for adjusting the extent which said additional valve restricts the flow of hydraulic liquid in said passage means during compression of said suspension unit.

38. The hydraulic suspension unit according to claim 37, wherein said compression damping valve and said rebound damping valve are arranged coaxially in a single assembly in said hydraulic suspension unit.

39. The hydraulic suspension unit according to claim 37, wherein said passage means directs all of the flow of hydraulic liquid from said first chamber during compression of the suspension unit to said reservoir via said compression damping means and directs all of the flow of hydraulic liquid from the reservoir to the first chamber via said rebound damping means.

* * * * *